United States Patent [19]
Kumagai

[11] Patent Number: 6,115,212
[45] Date of Patent: Sep. 5, 2000

[54] STRUCTURE FOR PREVENTING MISINSERTION OF RECORDING-MEDIUM CARTRIDGES

[75] Inventor: Hideaki Kumagai, Kanagawa, Japan

[73] Assignee: Sony Corporation, Tokyo, Japan

[21] Appl. No.: 09/211,593

[22] Filed: Dec. 14, 1998

[30] Foreign Application Priority Data

Dec. 25, 1997 [JP] Japan .................................. 9-355994
Nov. 16, 1998 [JP] Japan ................................ 10-325077

[51] Int. Cl.[7] .......................... G11B 17/02; G11B 17/04;
G11B 19/04; G11B 23/03
[52] U.S. Cl. ....................................... 360/99.06; 369/77.2
[58] Field of Search ................................ 360/99.06, 133;
369/77.2, 291

[56] References Cited

U.S. PATENT DOCUMENTS

| 4,731,776 | 3/1988 | Ishii et al. ............................. | 369/77.2 |
|---|---|---|---|
| 4,747,001 | 5/1988 | Kokubo et al. ........................ | 360/97 |
| 4,918,550 | 4/1990 | Baranski ................................ | 360/94 |
| 5,063,554 | 11/1991 | Uehara .................................. | 369/77.2 |
| 5,163,037 | 11/1992 | Ohmori et al. ........................ | 369/77.2 |
| 5,164,935 | 11/1992 | Shimegi et al. ....................... | 369/77.2 |
| 5,325,243 | 6/1994 | Rath et al. ............................. | 360/71 |
| 5,530,691 | 6/1996 | Fujisawa ................................ | 369/291 |
| 5,612,940 | 3/1997 | Otsuka et al. ......................... | 369/77.2 |

FOREIGN PATENT DOCUMENTS

| 0506054 A2 | 9/1992 | European Pat. Off. . |
|---|---|---|
| 0609617 A2 | 8/1994 | European Pat. Off. . |
| 0652558 A2 | 5/1995 | European Pat. Off. . |
| 0730269 A1 | 9/1996 | European Pat. Off. . |
| 0779622 A2 | 6/1997 | European Pat. Off. . |
| 62-047860 | 3/1987 | Japan . |
| 63-231763 | 9/1988 | Japan . |
| 2-94086 | 4/1990 | Japan . |
| 4-67345 | 3/1992 | Japan . |
| 4-67461 | 3/1992 | Japan . |
| 7-153155 | 6/1995 | Japan . |
| 7-334909 | 12/1995 | Japan . |
| 9-171670 | 6/1997 | Japan . |
| 9-190672 | 7/1997 | Japan . |
| 96/12285 | 4/1996 | WIPO . |
| 97/22970 | 6/1997 | WIPO . |

OTHER PUBLICATIONS

Patent Abstracts of Japan, JP 7–334965 A, Published Dec. 22, 1995, Matsushita Electric Inc. Co. Ltd.
Patent Abstracts of Japan, JP 8–55414 A, Published Feb. 27, 1996, Yamaha Corp.

Primary Examiner—William Klimowicz
Attorney, Agent, or Firm—Limbach & Limbach L.L.P.; Seong-Kun Oh

[57] ABSTRACT

A structure for preventing misinsertion of disc cartridges includes an inclined face formed at one side of the front end face of a shell of a disc cartridge of first format and for contacting a misinsertion preventing member of a superordinate drive, a groove formed in a shell of a disc cartridge of second format in the position corresponding to the inclined face and for engaging with the misinsertion preventing member, and a groove formed in a shell of a disc cartridge of third format in the same way as the disc cartridge of second format. The misinsertion preventing member, which is arranged with a cartridge holder of the superordinate drive, contacts the inclined face to disallow insertion of the disc cartridge of first format up to the position of releasing locking of a trigger lever of a cartridge-holder slide plate.

7 Claims, 24 Drawing Sheets

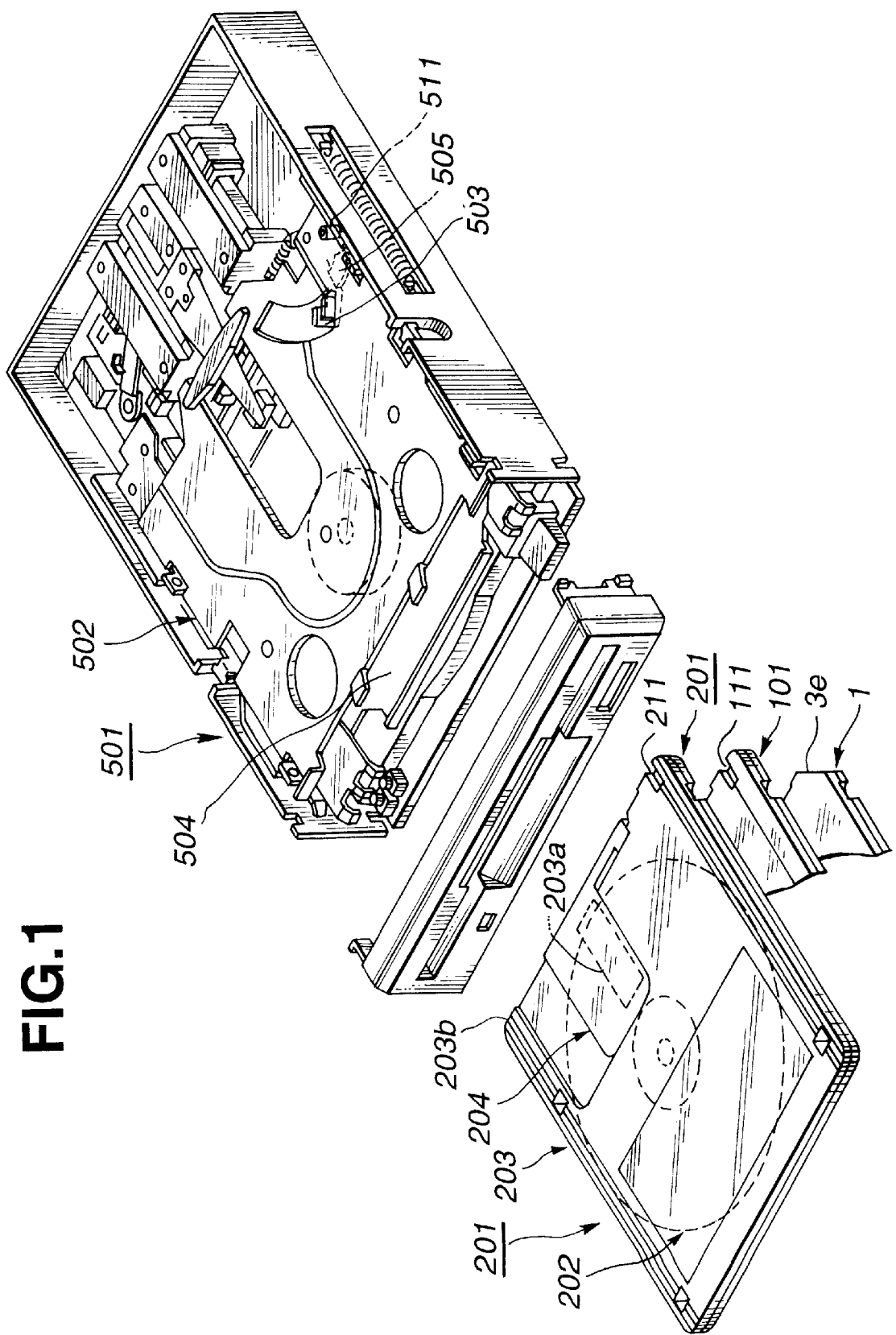

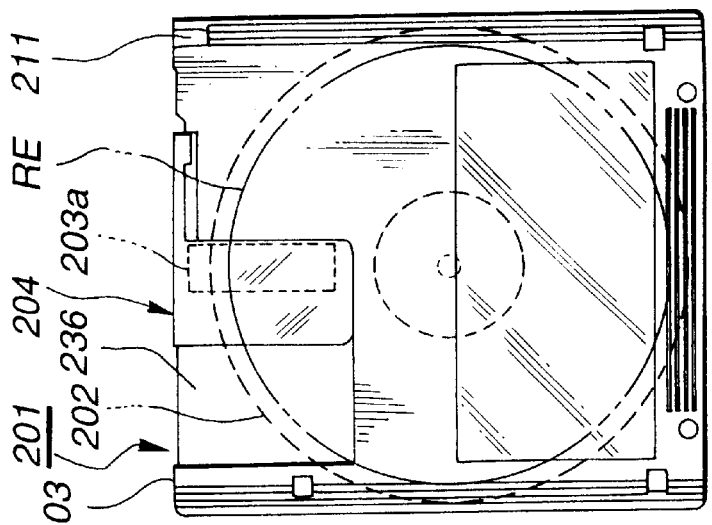
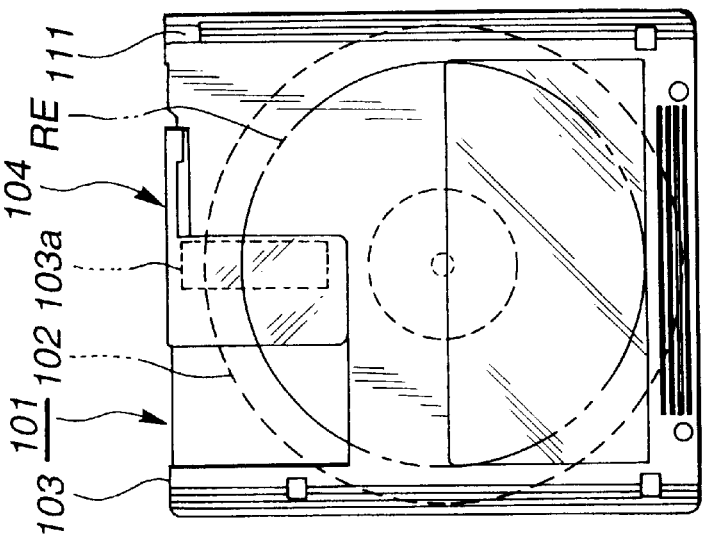
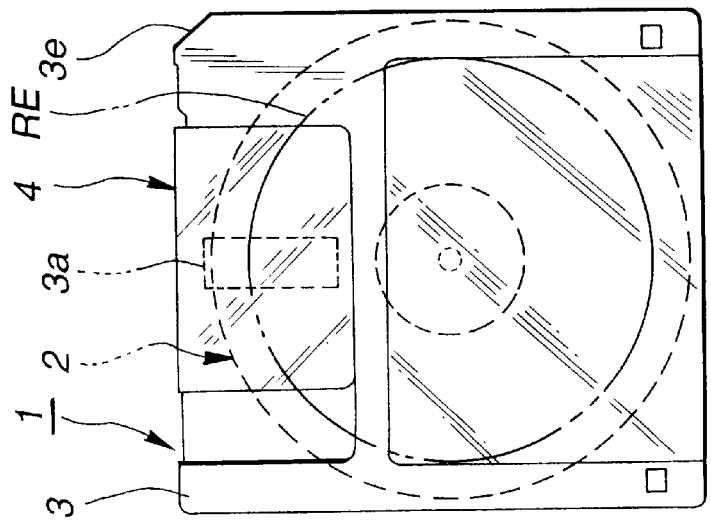

FIG.14
(PRIOR ART)
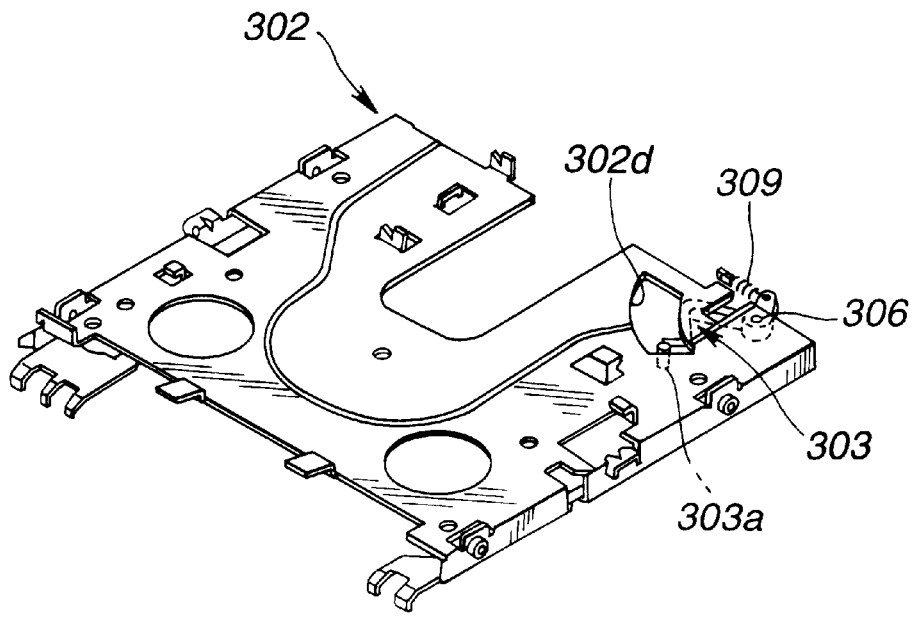
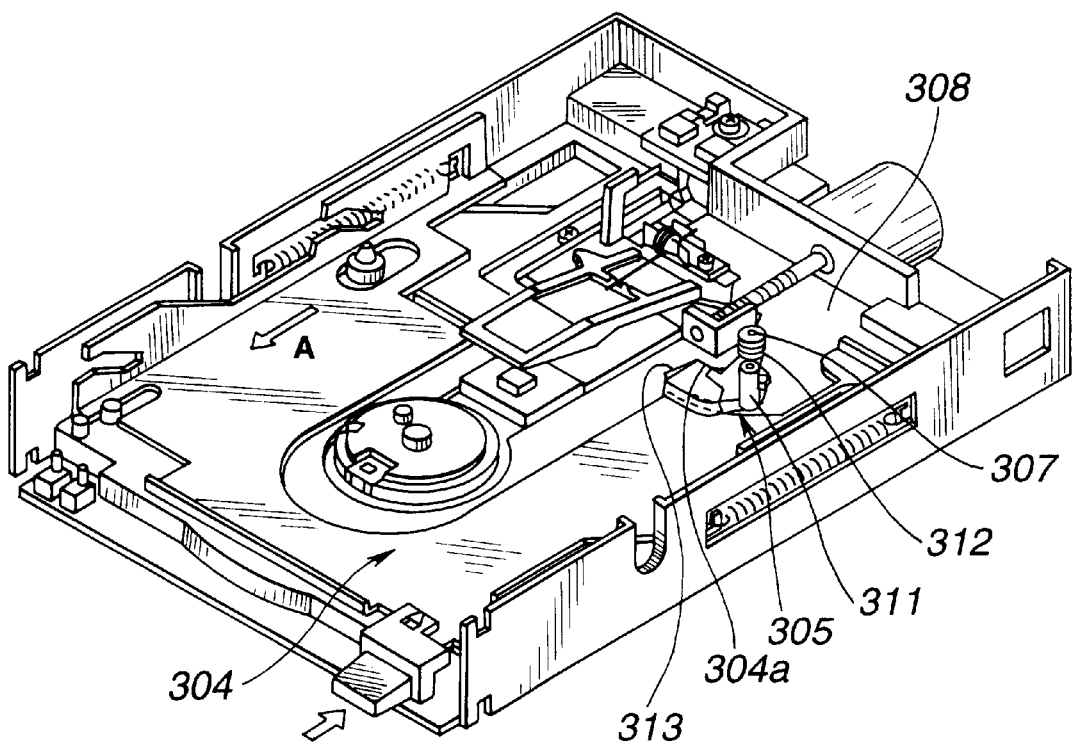

FIG.15
(PRIOR ART)
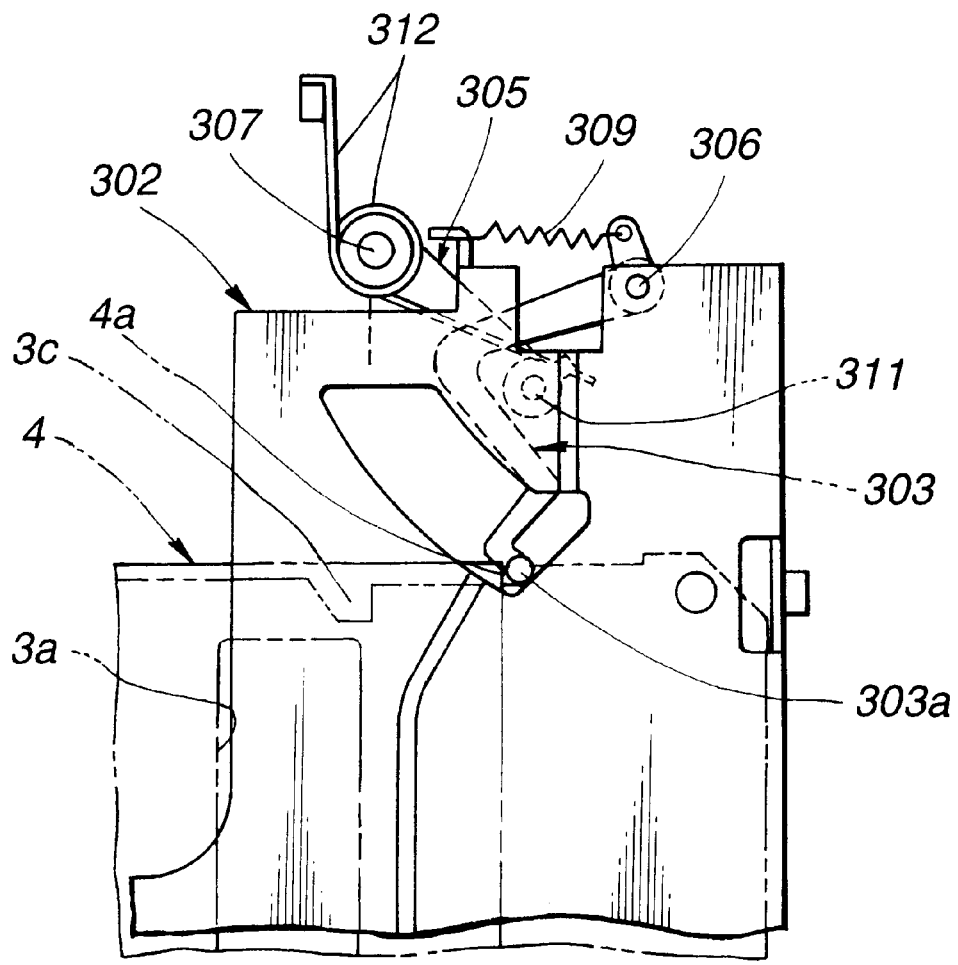
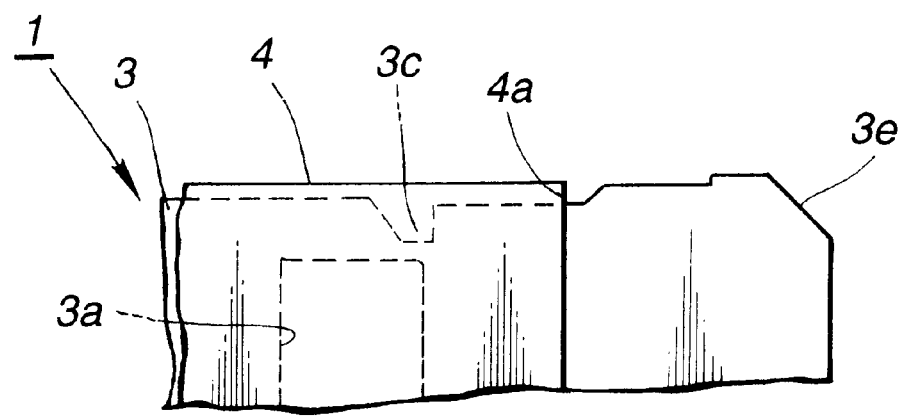

FIG.24

| DISC DRIVE / DISC CARTRIDGE | 1ST DISC DRIVE | 2ND DISC DRIVE | 3RD DISC DRIVE |
|---|---|---|---|
| 1ST FORMAT | POSSIBLE | POSSIBLE | IMPOSSIBLE |
| 2ND FORMAT | IMPOSSIBLE | POSSIBLE | POSSIBLE |
| 3RD FORMAT | IMPOSSIBLE | POSSIBLE | POSSIBLE |

STRUCTURE FOR PREVENTING MISINSERTION OF RECORDING-MEDIUM CARTRIDGES

BACKGROUND OF THE INVENTION

The present invention relates generally to a drive for recording mediums such as floppy discs with high storage capacity received in cartridges, and more particularly, to a structure for preventing misinsertion of such recording-medium cartridges.

FIG. 13 shows a known 3.5" microfloppy disc (MFD) cartridge 1, which includes a disc-like recording medium or magnetic recording medium 2, a shell 3 rotatably accommodating the disc-like recording medium 2, and a shutter 4 slidably mounted to the shell 3 to close recording or reproducing opening 3a formed in upper and lower halves of the shell 3.

The shell 3 is formed like a flattened rectangular box, and has a front end face 3b as viewed in the direction of insertion into a cartridge holder 302 of a drive 301. A groove 3c is formed in the front end face 3b to engage with a shutter engagement 303a of a shutter opening member 303 arranged with the cartridge holder 302. The groove 3c is located in a shutter slide area 3d of the shell 3, and is closed by the shutter 4 when the opening 3a is closed by it.

An inclined face 3e is formed at one side of the front end face 3b of the shell 3. Refer hereafter the disc cartridge with the inclined face 3e at one side of the front end face 3b of the shell 3 to as a disc cartridge of first format.

The drive 301 for the disc cartridge 1 of first format (refer hereafter to as a subordinate drive) includes a cartridge holder 302 for holding the disc cartridge 1 of first format as inserted therein, the shutter opening member 303 for opening the opening 3a by contacting one end 4a of the shutter 4 of the disc cartridge 1 of first format inserted into the cartridge holder 302 to slide the shutter 4, and a trigger lever 305 for allowing downward movement of the cartridge holder 302 by releasing after opening the opening 3a lock of a cartridge-holder slide plate 304 to slide it.

The conventional subordinate drive 301 includes a separate-trigger-type drive having the shutter opening member 303 and the trigger lever 305 formed separately, and an integrated-trigger-type drive having the shutter opening member 303 and the trigger lever 305 formed integrally.

Referring to FIG. 14, the separate-trigger-type subordinate drive is constructed such that the shutter opening member 303 has one end formed with a shutter engagement 303a, and another end rotatably mounted to the cartridge holder 302 through a pivot shaft 306. The trigger lever 305 is rotatably mounted to a chassis 308 through a pivot shaft 307.

Referring to FIG. 15, the separate-trigger-type subordinate drive 301 is constructed such that when inserting into the cartridge holder 302 the disc cartridge 1 of first format in the normal position, as shown by two-dot chain lines, with the shutter engagement 303a of the shutter opening member 303 contacting the one end 4a of the shutter 4, the shutter opening member 303 rotates clockwise about the pivot shaft 306 against the force of a coil spring 309 to slide the shutter 4 through the shutter engagement 303a.

Referring to FIG. 16, when sliding the shutter 4 through the shutter engagement 303a up to the position where the opening 3a is fully opened, the shutter engagement 303a comes to face the groove 3c of the end face 3b of the shell 3. And, referring to FIG. 17, the disc cartridge 1 of first format is inserted further into the cartridge holder 302 with the shutter engagement 303a being engaged with the groove 3c. When obtaining insertion of the disc cartridge 1 of first format up to a predetermined position, rotation of the shutter opening member 303 is prevented by a stopper 310 to prevent its further insertion.

Referring to FIGS. 18–19, a pressed portion 311 of the trigger lever 305 is pressed by the front end face 3b of the shell 3, so that the trigger lever 305 rotates counterclockwise about the pivot shaft 307 against the force of a torsion coil spring 312 to release engagement of a locking portion 313 of the trigger lever 305 with a locked portion 304a of the cartridge-holder slide plate 304, i.e. locking of the cartridge-holder slide plate 304 by the trigger lever 305. This slides the cartridge-holder slide plate 304 to move the cartridge holder 302 downward.

Referring to FIG. 20, the separate-trigger-type subordinate drive 301 is constructed such that when inserting into the cartridge holder 302 the disc cartridge 1 of first format in a position other than the normal position, even with rotation of the shutter opening member 303 coming to be prevented by the stopper 310, the shutter engagement 303a of the shutter opening member 303 does not face the groove 3c of the end face 3b of the shell 3. Thus, no further insertion of the disc cartridge 1 of first format into the cartridge holder 302 is carried out, so that the trigger lever 305 is not pressed in the locking releasing direction, producing no downward movement of the cartridge holder 302.

On the other hand, referring to FIG. 21, the integrated-trigger-type subordinate drive 301 is constructed such that the shutter opening member 303 has one end rotatably mounted to the chassis 308 through the pivot shaft 306, and another end formed with the shutter engagement 303a. The trigger lever 305, which is integrated with the shutter opening member 303 in the vicinity of the shutter engagement 303a, engages with the locked portion 304a of the cartridge-holder slide plate 304a.

A misinsertion preventing member 311 in the form of a torsion coil spring is arranged with the cartridge holder 302 of the integrated-trigger-type subordinate drive 301. Referring to FIG. 22, the misinsertion preventing member 311 is constructed such that when inserting into the cartridge holder 302 the disc cartridge 1 of first format in the normal position, one end 311a of the misinsertion preventing member 311 contacts the inclined face 3e of the shell 3 of the disc cartridge 1 of first format, and turns to the outside of the disc cartridge 1 of first format through the inclined face 3e to allow its insertion in the cartridge holder 302. On the other hand, referring to FIG. 23, when inserting into the cartridge holder 302 the disc cartridge 1 of first format in other position than the normal position, the one end 311a of the misinsertion preventing member 311 does not contact the inclined face 3e, and therefore cannot turn to the outside of the disc cartridge 1 of first format. Thus, the one end 311a of the misinsertion preventing member 311 is in the stretched state to prevent the insertion of the disc cartridge 1 of first format into the cartridge holder 302.

With an enlargement of the application field and the sphere of disc cartridges, there is an increasing demand for disc cartridges having greater storage capacity. In order to meet this demand, disc cartridges of second format are developed which have far greater storage capacity than that of the known 3.5" MFDs.

When using the shell of the known disc cartridge of first format as shown in FIG. 13 for the shell of the disc cartridge of second format, the disc cartridge of second format is loaded in the conventional subordinate drive 301. Due to the difference in disc rotating speed, recording/reading method, and so on, the disc cartridges of second format cannot applied to the conventional subordinate drive 301. Thus, when receiving the disc cartridge of second format, due to impossible readout of data that are actually recorded on the disc-like recording medium, the subordinate drive 301 may determine that the disc-like recording medium is not initialized. This may cause reformatting of the disc-like recording medium, resulting in possible erasing of important data recorded thereon. On the other hand, a drive for disc cartridges of second format (refer hereafter to as a midordinate drive) is required to ensure the applicability of the disc cartridges of first format through subordination compatibility.

In response to such demand, referring to FIG. 24, there have been developed a drive for disc cartridges of second format having subordination compatibility or a midordinate drive that is available to both the disc cartridges of second format that cannot be applied to the drive for disc cartridges of first format or the subordinate drive and the known disc cartridges of first format, and a structure for preventing misinsertion of disc cartridges. In this connection, see U.S. patent application Ser. No. 09/114,754 filed on Jul. 13, 1998.

Referring to FIGS. 25–26, this application shows a groove 111 arranged with the disc cartridge 101 of second format, and a misinsertion preventing member 411 arranged with the midordinate drive 401.

The groove 111 of the disc cartridge 101 of second format is formed in a front end face of a shell 103 and outside a shutter slide area. Referring also to FIGS. 21–23, the groove 111 engages with the one end 311*a* of the misinsertion preventing member 311 of the integrated-trigger-type subordinate drive 301 to prevent the misinsertion preventing member 311 from turning to the outer side face of the shell 103, and engages also with a protrusion 411*a* of the misinsertion preventing member 411 of the midordinate drive 401.

The misinsertion preventing member 411 of the midordinate drive 401 is constructed such that when inserting into a cartridge holder 402 the disc cartridge 101 of second format in the normal position, the protrusion 411*a* of the misinsertion preventing member 411 engages with the groove 111 to enable insertion of the disc cartridge 101 of second format up to the position where a trigger lever 405 (see FIG. 27) releases locking of a cartridge-holder slide plate 404. And, when inserting into the cartridge holder 402 the disc cartridge 1 of first format with the inclined face 3*e* at one side of the front end face of the shell 3, the misinsertion preventing member 411 contacts the inclined face 3*e* of the disc cartridge 1 of first format to turn to outside thereof.

Therefore, when inserting into the midordinate drive 401 the disc cartridge 101 of second format in the normal position, referring to FIG. 27, the protrusion 411*a* of the misinsertion preventing member 411 engages with the groove 111, so that a shutter opening member 403 rotates clockwise about a pivot shaft 406 against the force of a coil spring 409 to open the shutter 4. Moreover, referring to FIG. 28, the engagement of the trigger lever 405 with a trigger engagement 404*a* of the cartridge-holder slide plate 404 is removed to release locking of the cartridge-holder slide plate 404 by the trigger lever 405, so that the cartridge-holder slide plate 404 is slid in the direction of arrow A by the force of a spring, not shown, to move the cartridge holder 402 downward.

Referring to FIG. 29, when inserting into the cartridge holder 302 of the subordinate drive 301 the disc cartridge 101 of second format, the one end 311*a* of the misinsertion preventing member 311 of the subordinate drive 301 engages with the groove 111, and its head contacts the shell 103 to prevent the disc cartridge 101 of second format from further entering the cartridge holder 302 of the subordinate drive 301.

Referring to FIG. 30, when inserting into the cartridge holder 402 of the midordinate drive 401 the disc cartridge 1 of first format in the normal position, the protrusion 411*a* of the misinsertion preventing member 411 contacts the inclined face 3*e* of the disc cartridge 1 of first format, and turns to the outside thereof against the force of a coil spring 412 to allow loading of the disc cartridge 1 of first format. On the other hand, referring to FIG. 31, when inserting into the midordinate drive 401 the disc cartridge 1 of first format or the disc cartridge 101 of second format in other position than the normal position, the protrusion 411*a* of the misinsertion preventing member 411 contacts the shell to prevent the disc cartridge 1 or 101 from further entering the cartridge holder 402 of the midordinate drive 401.

Referring to FIG. 24, in case of developing disc cartridges of third format having greater storage capacity corresponding to the next-generation high-capacity cartridges than that of the disc cartridges 101 of second format corresponding to the existing high-capacity disc cartridges, the measures for making a drive for disc cartridges of third format (refer hereafter to as a superordinate drive) available to the disc cartridges 101 of second format, but not to the disc cartridges 1 of first format need to rely upon preventing the insertion of the disc cartridge 1 of first format into the superordinate drive. The reason is that when extending the recording or reproducing openings for the disc-like recording medium of the disc cartridge of second or third format to the outer periphery with respect to the recording or reproducing openings for the disc-like recording medium of the disc cartridge of first format, and enlarging the recording area of the disc-like recording medium of the disc cartridge of third format to the outer periphery, when inserting into the superordinate drive the disc cartridge 1 of first format, a magnetic head, etc. of the superordinate drive may be damaged by contacting the edges of the recording or reproducing openings of the disc cartridge 1 of first format.

It is, therefore, an object of the present invention to provide a structure for preventing insertion of disc cartridges of first format into the superordinate drive.

SUMMARY OF THE INVENTION

One aspect of the present invention lies in providing a system, comprising:

a first recording-medium cartridge of first format and a first drive corresponding to said first recording-medium cartridge;

a second recording-medium cartridge of second format and a second drive corresponding to said first and second recording-medium cartridge;

a third recording-medium cartridge of third format and a third drive corresponding to said second and third recording-medium cartridge;

first means for preventing misinsertion of said first, second and third recording-medium cartridges into said first drive;

second means for preventing misinsertion of said first, second and third recording-medium cartridges into said second drive; and third means for preventing misinsertion of said first, second and third recording-medium cartridges into said third drive, said first means comprising an inclination of a first corner of a front end face of said first recording-medium cartridge as viewed in a direction of insertion thereof into said first drive, and a first misinsertion preventing member arranged with said first drive, said first misinsertion preventing member cooperating with said inclination, when inserting said first recording-medium cartridge in a normal position, to allow loading thereof, said second means comprising a second corner of a frond end face of said second recording-medium cartridge as viewed in a direction of insertion thereof in said second drive, said second corner corresponding to said first corner of said first recording-medium cartridge and being formed with a groove, and a second misinsertion preventing member arranged with said second drive, said second misinsertion preventing member cooperating with said inclination of said first corner, when inserting said first recording-medium cartridge in a normal position, to allow loading thereof, said second misinsertion preventing member cooperating with said groove of said second corner, when inserting said second recording-medium cartridge in a normal position, to allow loading thereof, said third means comprising a third corner of said third recording-medium cartridge, said third corner corresponding to said groove of said second corner of said second recording-medium cartridge and being formed with a groove, and a third misinsertion preventing member arranged with said third drive, said third misinsertion preventing member cooperating with said inclination of said first corner, when inserting said first recording-medium cartridge in a normal position, to disallow loading thereof, said third misinsertion preventing member cooperating with said groove of corresponding one of said second and third corners, when inserting one of said second and third recording-medium cartridges, to allow loading thereof.

Another aspect of the present invention lies in providing a structure for preventing misinsertion of recording-medium cartridges into drives, the recording-medium cartridges and drives including a first recording-medium cartridge of first format and a first drive corresponding to the first recording-medium cartridge, a second recording-medium cartridge of second format and a second drive corresponding to the first and second recording-medium cartridge, and a third recording-medium cartridge of third format and a third drive corresponding to the second and third recording-medium cartridge, the structure comprising:

first means for preventing misinsertion of the first, second and third recording-medium cartridges into the first drive;

second means for preventing misinsertion of the first, second and third recording-medium cartridges into the second drive; and third means for preventing misinsertion of the first, second and third recording-medium cartridges into the third drive, said first means comprising an inclination of a first corner of a front end face of the first recording-medium cartridge as viewed in a direction of insertion thereof into the first drive, and a first misinsertion preventing member arranged with the first drive, said first misinsertion preventing member cooperating with said inclination, when inserting the first recording-medium cartridge in a normal position, to allow loading thereof, said second means comprising a second corner of a frond end face of the second recording-medium cartridge as viewed in a direction of insertion thereof in the second drive, said second corner corresponding to said first corner of the first recording-medium cartridge and being formed with a groove, and a second misinsertion preventing member arranged with the second drive, said second misinsertion preventing member cooperating with said inclination of said first corner, when inserting the first recording-medium cartridge in a normal position, to allow loading thereof, said second misinsertion preventing member cooperating with said groove of said second corner, when inserting the second recording-medium cartridge in a normal position, to allow loading thereof, said third means comprising a third corner of the third recording-medium cartridge, said third corner corresponding to said groove of said second corner of the second recording-medium cartridge and being formed with a groove, and a third misinsertion preventing member arranged with the third drive, said third misinsertion preventing member cooperating with said inclination of said first corner, when inserting the first recording-medium cartridge in a normal position, to disallow loading thereof, said third misinsertion preventing member cooperating with said groove of corresponding one of said second and third corners, when inserting one of the second and third recording-medium cartridges, to allow loading thereof.

BRIEF DESCRIPTION OF THE DRAWINGS

FIG. 1 is a perspective view showing disc cartridges of first, second and third formats and their superordinate drive embodying the present invention.

FIGS. 2A–2C are plan views showing the prior-art disc cartridge of first format, the related-art disc cartridge of second format, and the inventive disc cartridge of third format, respectively.

FIG. 14 is a view similar to FIG. 6, showing the subordinate drive.

FIG. 15 is a view similar to FIG. 11, showing the operation of the subordinate drive upon normal insertion.

FIG. 24 is a table illustrating insertability of the disc cartridges of first, second and third formats into the drives.

DETAILED DESCRIPTION OF THE INVENTION

Figure 3:
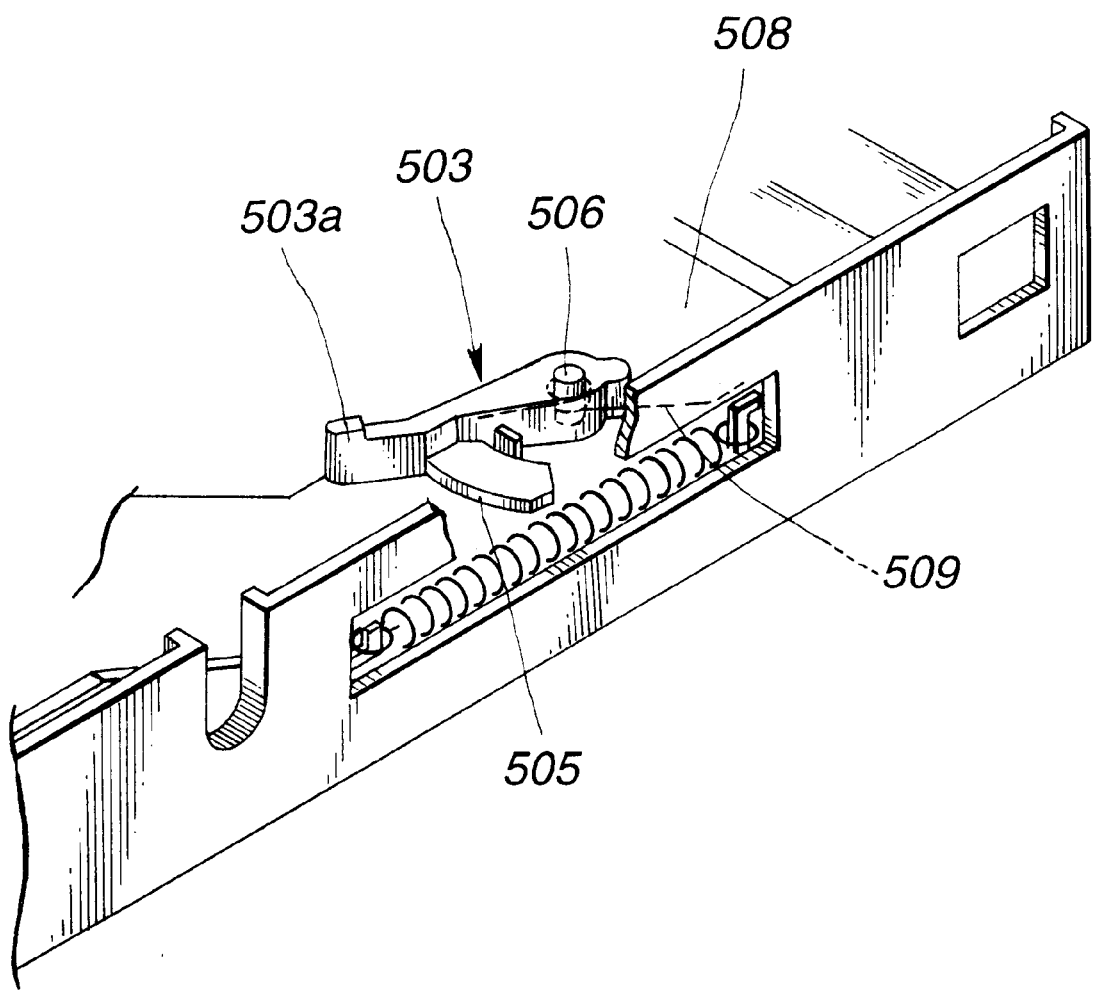
FIG. 3 is an enlarged perspective view showing a shutter opening member and a trigger lever.

FIGS. 1–11 show a first embodiment of the present invention. FIG. 1 shows 3.5" microfloppy disc (MFD) cartridges 1, 101, 201 of first, second and third formats, and a superordinate drive 501 that is available to the disc cartridges 101, 201 of second and third formats. It is noted that the disc cartridge 101 of second format is of greater storage capacity than that of the disc cartridge 1 of first format, and the disc cartridge 201 of third format is of greater storage capacity than that of the disc cartridge 101 of second format. The superordinate drive 501 disallows insertion of the disc cartridge 1 of first format, and allows insertion of the disc cartridges 101, 201 of second and third formats.

The disc cartridge 1 of first format has the inclined face 3e at one side of the front end face of the shell, which the misinsertion preventing member of the drive contacts.

The disc cartridge 101 of second format having greater storage capacity than that of the disc cartridge 1 of first format has the groove 111 at one side of the front end face of the shell in the position corresponding to the inclined face 3e of the disc cartridge 1 of first format to engage with the misinsertion preventing member of the drive.

In the way similar to the disc cartridge 101 of second format, the disc cartridge 201 of third format having greater storage capacity than that of the disc cartridge 101 of second format has a groove 211 at one side of a front end face of a shell 203 to engage with the misinsertion preventing member of the drive.

A cartridge holder 502 of the superordinate drive 501 for the disc cartridge 201 of third format is formed with a misinsertion preventing member 511. When inserting the disc cartridge 1 of first format, the misinsertion preventing member 511 contacts the inclined face 3e to disallow its insertion up to the cartridge slide position, whereas when inserting the disc cartridge 101 of second format or the disc cartridge 201 of third format, the misinsertion preventing member 511 engages with the groove 111 or 211 to allow its insertion up to the cartridge slide position.

Referring to FIGS. 2A–2C, the disc cartridges 101, 201 of second and third formats have recording or reproducing openings 103a, 203a each having one end extending to the outer periphery of disc-like recording mediums 102, 202 with respect to the recording or reproducing openings 3a of the disc cartridge 1 of first format. Particularly, the recording area RE of the disc-like recording medium 202 of the disc cartridge 201 of third format is enlarged to the outer periphery with respect to the recording area RE of the disc-like recording medium 2 of the disc cartridge 1 of first format. It is noted that the recording area RE of the disc-like recording medium 102 of the disc cartridge 101 of second format is substantially equal to the recording area RE of the disc-like recording medium 2 of the disc cartridge 1 of first format.

The disc cartridge 201 of third format includes the disc-like recording medium 202, a shell 203 for rotatably accommodating the disc-like recording medium 202, and a shutter 204 arranged with the shell 203 for closing the recording or reproducing openings 203a.

The shell 203 has a groove 211 at one side of the front end face in the position corresponding to the inclined face 3e of the disc cartridge 1 of first format and outside a shutter slide area 236 to allow engagement of the misinsertion preventing member 311 of the subordinate drive 301 or the misinsertion preventing member 411 of the midordinate drive 401 or the misinsertion preventing member 511 of the superordinate drive 501.

As shown in FIG. 1, the superordinate drive 501 includes a cartridge holder 502 for holding the disc cartridge 201 of third format or the disc cartridge 101 of second format, a shutter opening member 503, and a trigger lever 505 for releasing locking of a cartridge-holder slide plate 504 by the front end face of the disc cartridge 101 of second format or the disc cartridge 201 of third format inserted into the cartridge holder 502 to slide the cartridge-holder slide plate 504, moving the cartridge holder 502 upward.

Referring to FIG. 3, the trigger lever 505 is integrated with the shutter opening member 503 in the vicinity of a shutter engagement 503a. The shutter opening member 503 has one end formed with the shutter engagement 503a, and another end rotatably mounted to a chassis 508 through a pivot shaft 506 and receiving counterclockwise torque from a torsion coil spring 509.

The cartridge holder 502 is formed with the the groove 111 of the disc cartridge 101 of second format or the groove 211 of the disc cartridge 201 of third format to allow its insertion up to the position of pressing the trigger lever 505, and contacts the inclined face 3e of the disc cartridge 1 of first format to disallow its insertion up to the above position.

Figure 4:
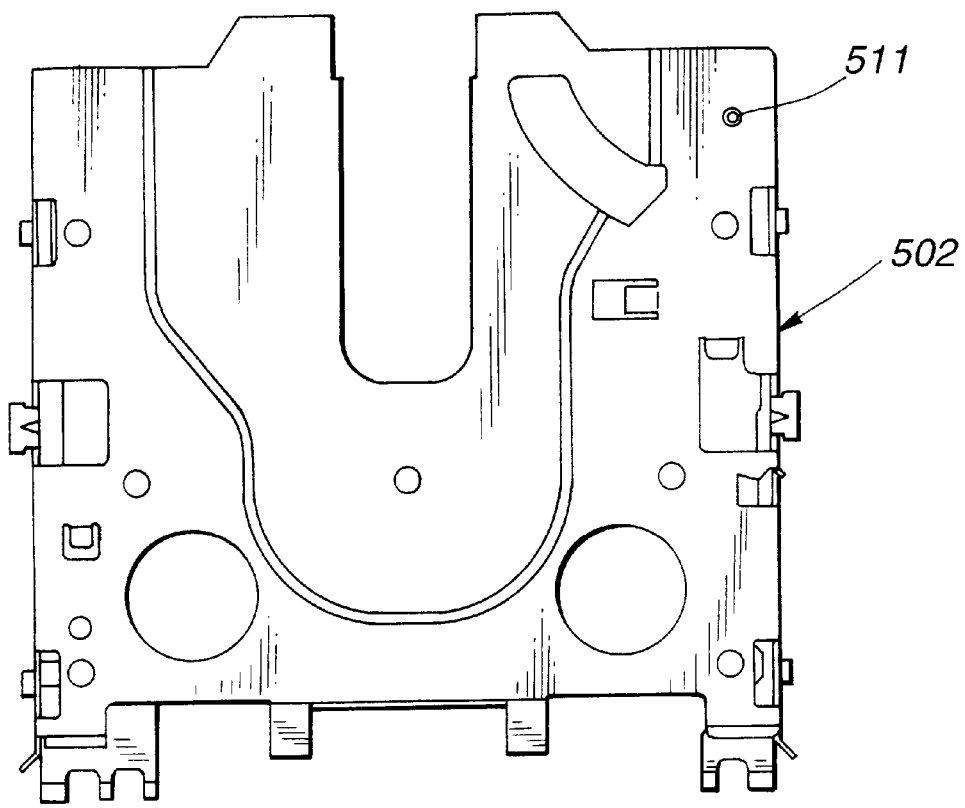
FIG. 4 is a view similar to FIG. 2C, showing a cartridge holder.
Figure 5:
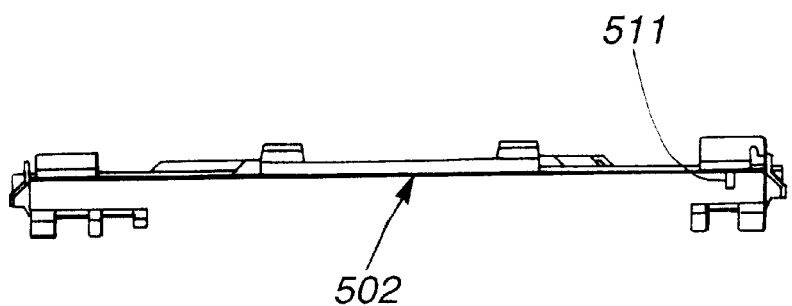
FIG. 5 is a front view showing the cartridge holder.

Referring to FIGS. 4–5, the misinsertion preventing member 511 of the superordinate drive 501 is stationarily mounted to the cartridge holder 502 through a pin arranged through an upper-side plate of the cartridge holder 502 from the lower side thereof.

Figure 6:
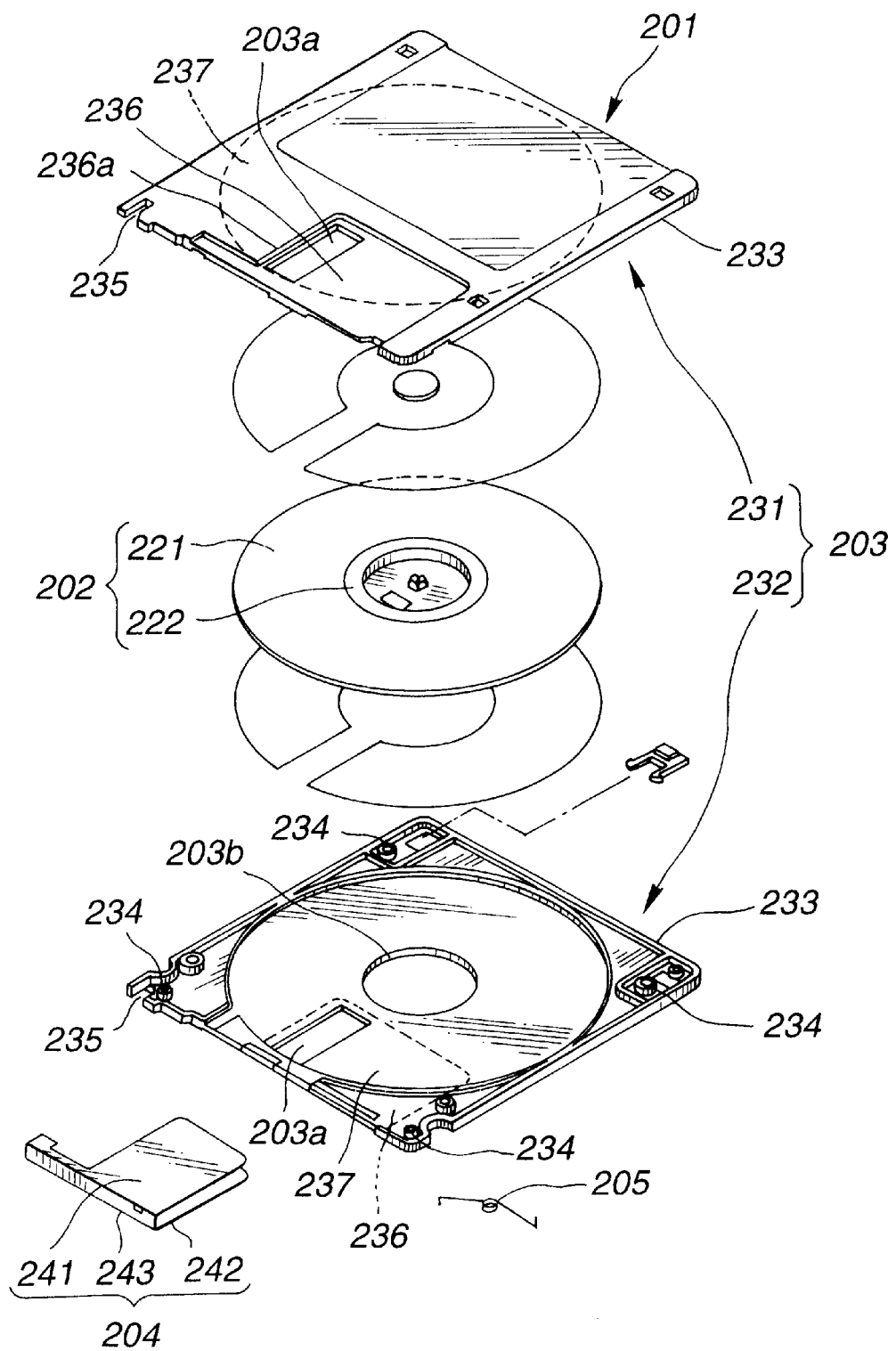
FIG. 6 is an exploded perspective view showing the disc cartridge of third format.

Referring to FIG. 6, the disc-like recording medium 202 of the disc cartridge 201 of third format is formed by mounting a metallic center hub 222 in the center of a synthetic-resin sheet or magnetic sheet 221 having a signal recording part.

The shell 203 is formed like a flattened box by carrying out ultrasonic welding of peripheral walls 233 and ribs 234 of the upper and lower halves 231 of thermoplastic resin put opposite to each other.

Each of the upper and lower halves 231, 232 has a recess 235 for forming the groove 211 for the misinsertion preventing member 511, which is arranged at one side of the front end face as viewed in the direction of insertion into the cartridge holder 502 of the superordinate drive 501 and in the position corresponding to the inclined face 3e of the disc cartridge 1 of first format as shown in FIG. 2A. When the upper and lower halves 231, 232 are welded to each other, the recesses 235 of the upper and lower halves 231, 232 face each other to form the groove 211 connecting the upper and lower sides of the shell 203.

Each of the upper and lower halves 231, 232 has the shutter slide area or shutter mounting concavity 236 in the outer side face, and a disc compartment 237 in the inner side face, both on the side of the front end face as viewed in the direction of insertion into the cartridge holder 502 of the superordinate drive 501.

The recording or reproducing openings 203a are formed in the upper and lower halves 231, 232 substantially in the center of the shutter slide area 236. A spindle opening 203b is formed in the lower half 232 in the center of the disc compartment 237. When accommodating the disc-like recording medium 202 in the disc compartment 237, the center hub 222 faces the spindle opening 203b, and the signal recording part of the synthetic-resin sheet 221 faces the recording or reproducing openings 203a.

The shutter 204 is formed like a C by a pair of closing plates 241, 242 placed on the outer faces of the upper and lower halves 231, 232, respectively, and a connecting plate 243 for connecting one ends of the closing plates 241, 242. The shutter 204 is slidably mounted to the shell 203 in the shutter slide area 236 with the upper and lower halves 231, 232 held by the closing plates 241, 242.

The shutter 204 is biased by a torsion coil spring 205, and pressed to one side 236a of the shutter slide area 236 to close the recording or reproducing openings 203a of the upper and lower halves 231, 232 of the shell 203 by the closing plates 241, 242. A duplicate description is omitted with regard to the disc cartridge 101 of second format due to its substantially similar structure to that of the disc cartridge 201 of third format except the recording area RE as well as the disc cartridge 1 of first format due to its description in connection with the prior art. It is noted that in the superordinate drive 501, the misinsertion preventing member 511 is arranged to correspond to the protrusion 411a of the misinsertion preventing member 411 of the midordinate drive 401.

Figure 7:
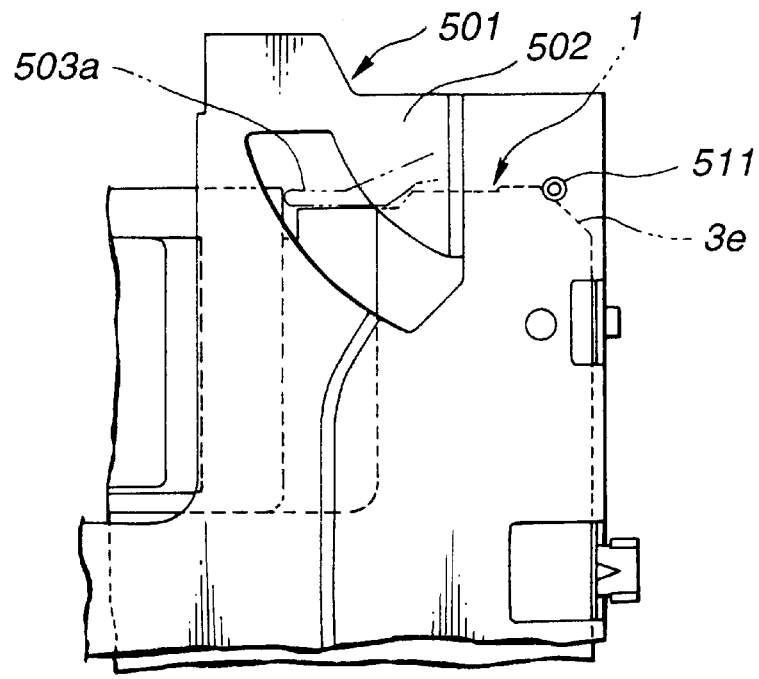
FIG. 7 is a fragmentary plan view showing the disc cartridge of first format as properly inserted.
Figure 8:
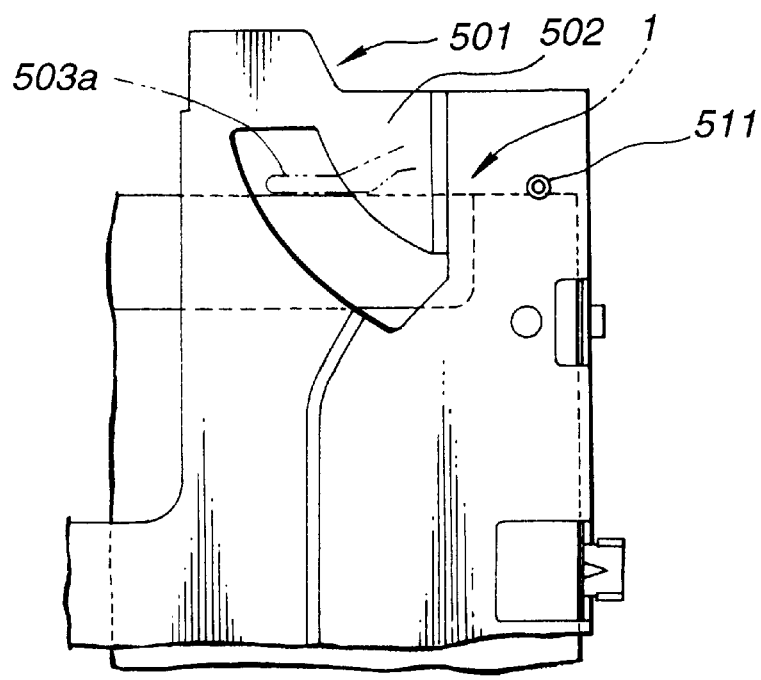
FIG. 8 is a view similar to FIG. 7, showing the disc cartridge of first format as improperly inserted.
Figure 9:
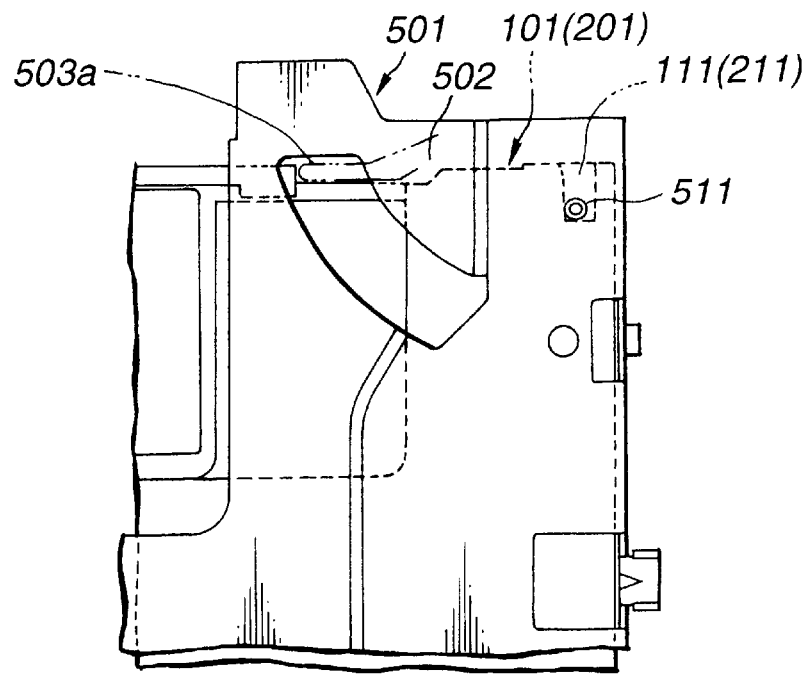
FIG. 9 is a view similar to FIG. 8, showing the disc cartridge of second or third format as properly inserted.
Figure 10:
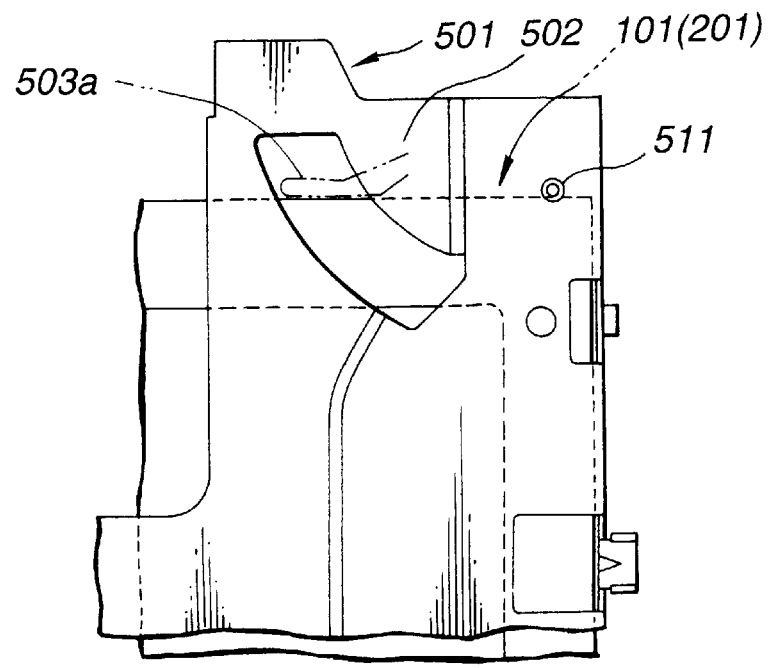
FIG. 10 is a view similar to FIG. 9, showing the disc cartridge of second or third format as improperly inserted.

Next, operation of the first embodiment will be described.
1) When Applying the Disc Cartridge 1 of First Format to the Superordinate Drive 501
   A) Upon Insertion in the Normal Position
   Referring to FIG. 7, when inserting into the cartridge holder 502 of the superordinate drive 501 the disc cartridge 1 of first format in the normal position, the misinsertion preventing member 511 contacts the inclined face 3e formed at one side of the front end face of the disc cartridge 1 of first format to disallow its further insertion into the cartridge holder 502, preventing release of locking of the cartridge-holder slide plate 504 by the trigger lever 505.
   B) Upon Misinsertion
   Referring to FIG. 8, when improperly inserting into the cartridge holder 502 of the superordinate drive 501 the disc cartridge 1 of first format, the misinsertion preventing member 511 contacts a portion of the end face of the disc cartridge 1 of first format other than the inclined face 3e to disallow its further insertion into the cartridge holder 502, preventing actuation of the trigger lever 505.
2) When Applying the Disc Cartridge 101 of Second Format or the Disc Cartridge 201 of Third Format to the superordinate Drive 501
   A) Upon Insertion in the Normal Position
   Referring to FIG. 9, when inserting into the cartridge holder 502 of the superordinate drive 501 the disc cartridge 101 of second format or the disc cartridge 201 of third format in the normal position, the misinsertion preventing member 511 of the superordinate drive 501 engages with the groove 111 of the disc cartridge 101 of second format or the groove 211 of the disc cartridge 201 of third format. Thus, the disc cartridge 101 of second format or the disc cartridge 201 of third format is inserted into the cartridge holder 502 up to the trigger-lever actuating position to actuate the trigger lever 505. This releases locking of the cartridge-holder slide plate 504 to slide the cartridge-holder slide plate 504, moving the cartridge holder 502 downward.
   B) Upon Misinsertion
   Referring to FIG. 10, the misinsertion preventing member 511 contacts a portion of the end face of the disc cartridge 101 of second format or the disc cartridge 201 of third format other than the groove 111 or 211 to disallow its further insertion into the cartridge holder 502. And the disc cartridge 101 or 201 actuates the trigger lever 505 to prevent release of locking of the cartridge-holder slide plate 504.

Figure 11:
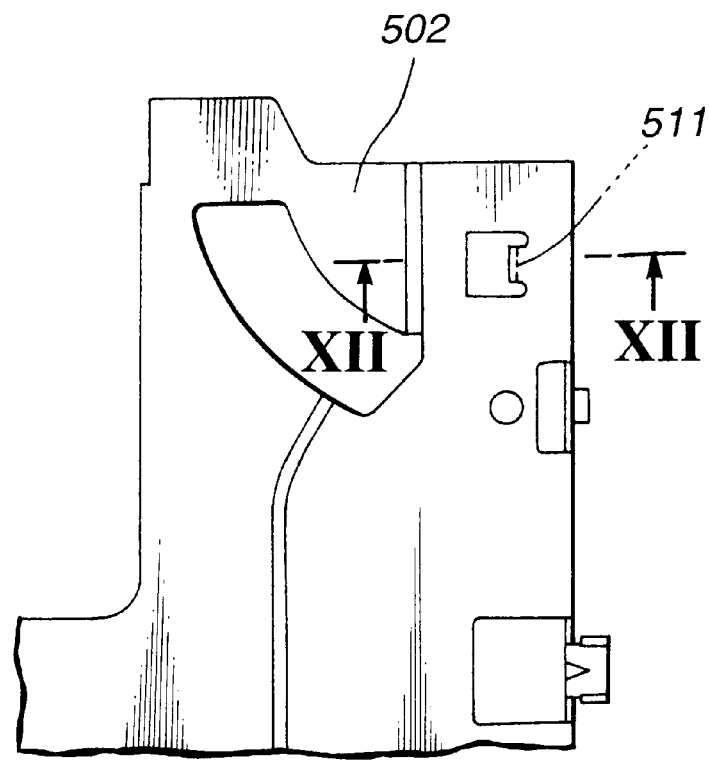
FIG. 11 is a view similar to FIG. 10, showing a second embodiment of the present invention.
Figure 12:
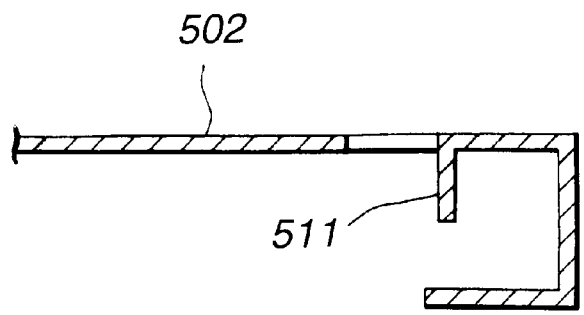
FIG. 12 is a sectional view taken along the line XII—XII in FIG. 11.
Figure 13:
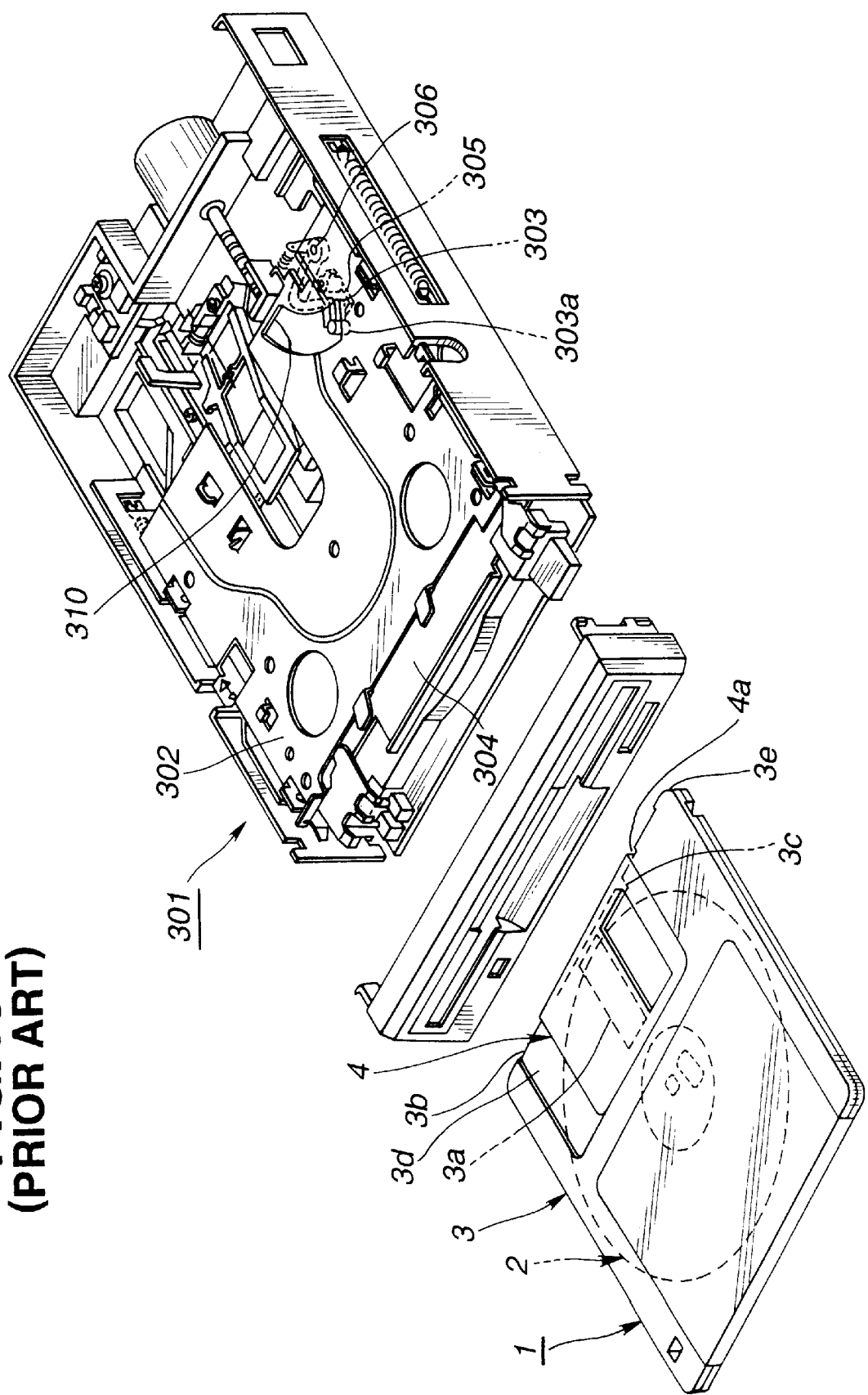
FIG. 13 is a view similar to FIG. 1, showing a known separate-trigger-type subordinate drive and the disc cartridge of first format.
Figure 16:
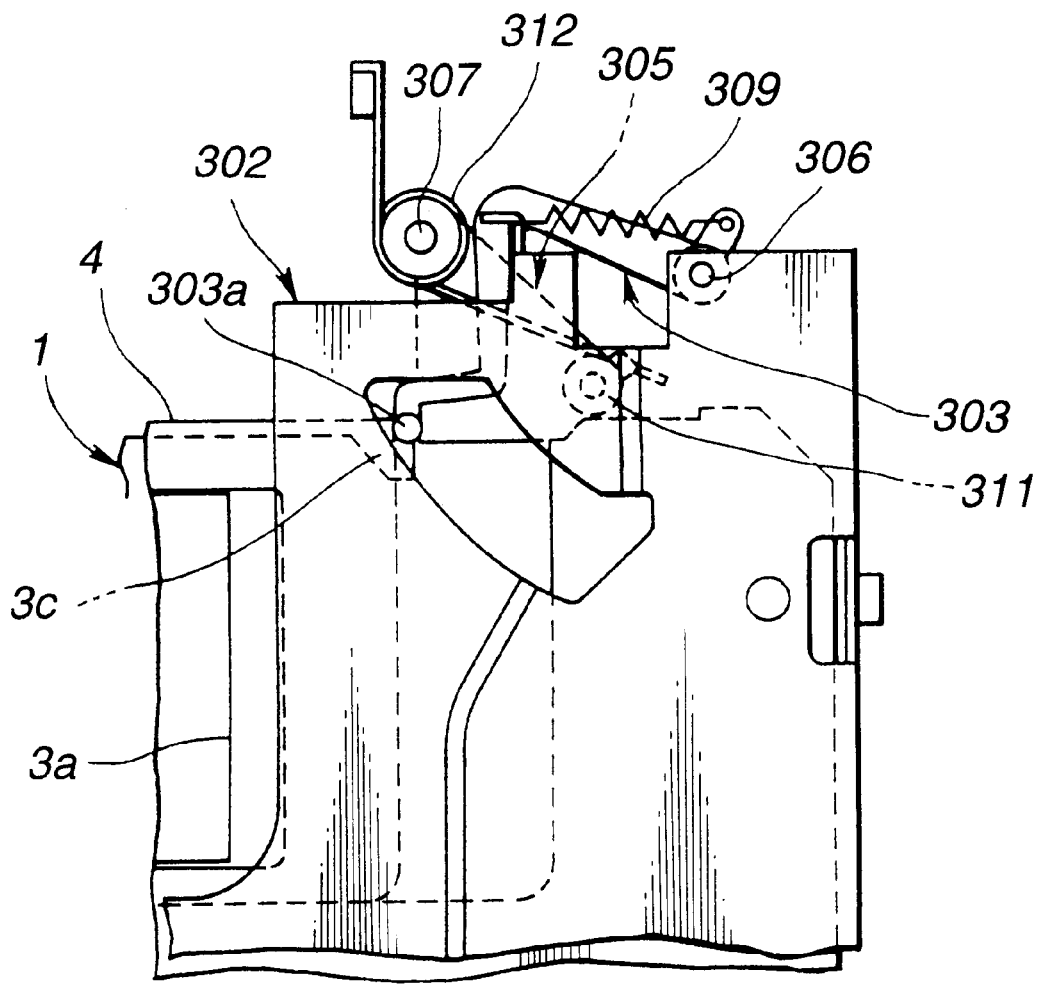
FIG. 16 is a view similar to FIG. 15, showing the operation of the subordinate drive upon normal insertion.
Figure 17:
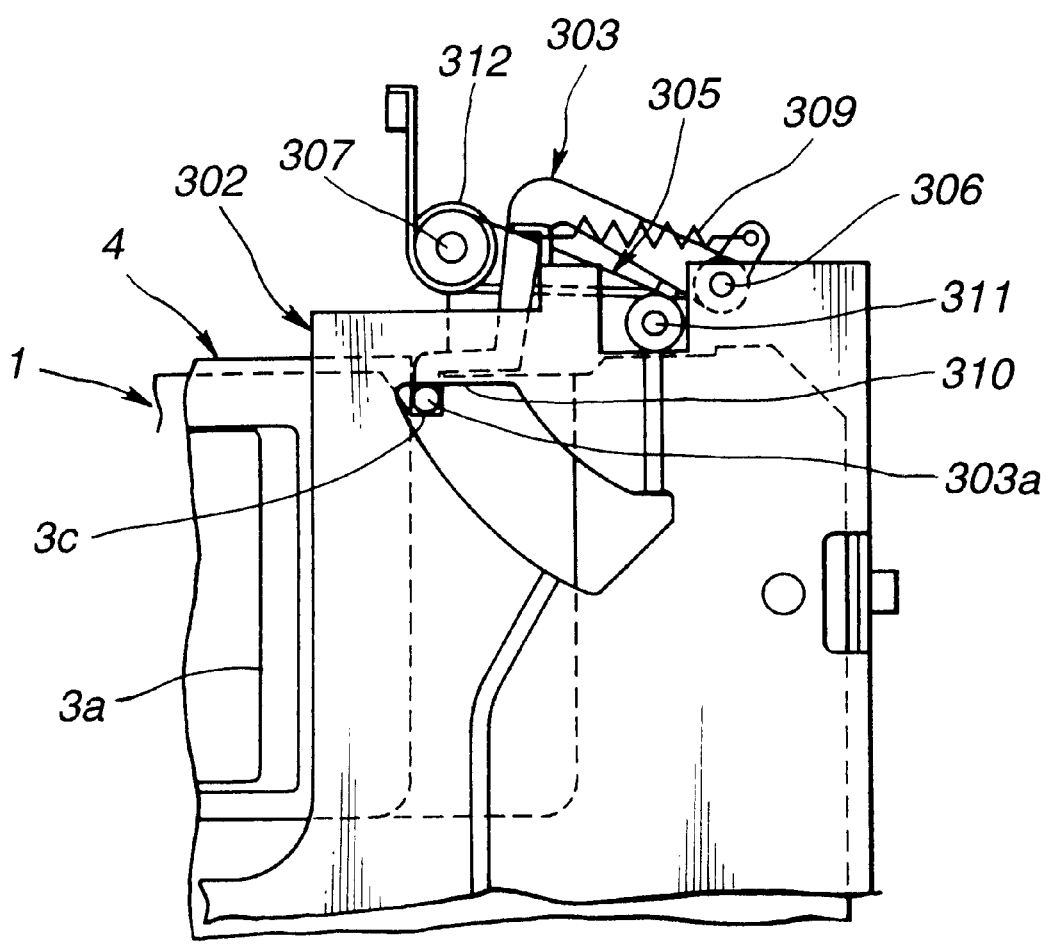
FIG. 17 is a view similar to FIG. 16, showing the operation of the subordinate drive upon normal insertion.
Figure 18:
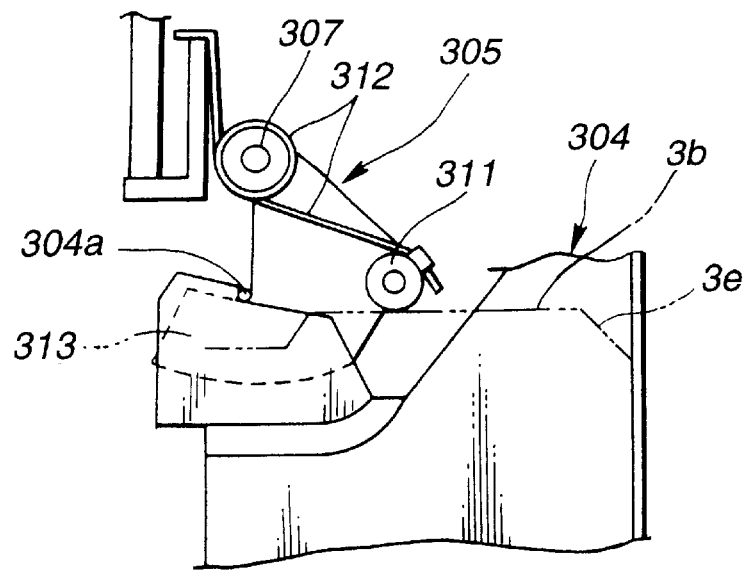
FIG. 18 is a view similar to FIG. 17, showing the operation of a known trigger lever in the locked state.
Figure 19:
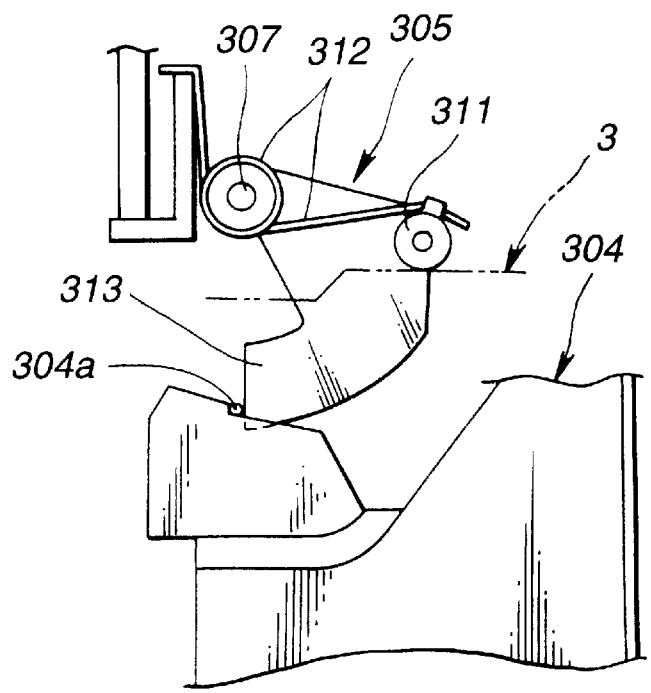
FIG. 19 is a view similar to FIG. 18, showing the operation of the known trigger lever in the locking released state.
Figure 20:
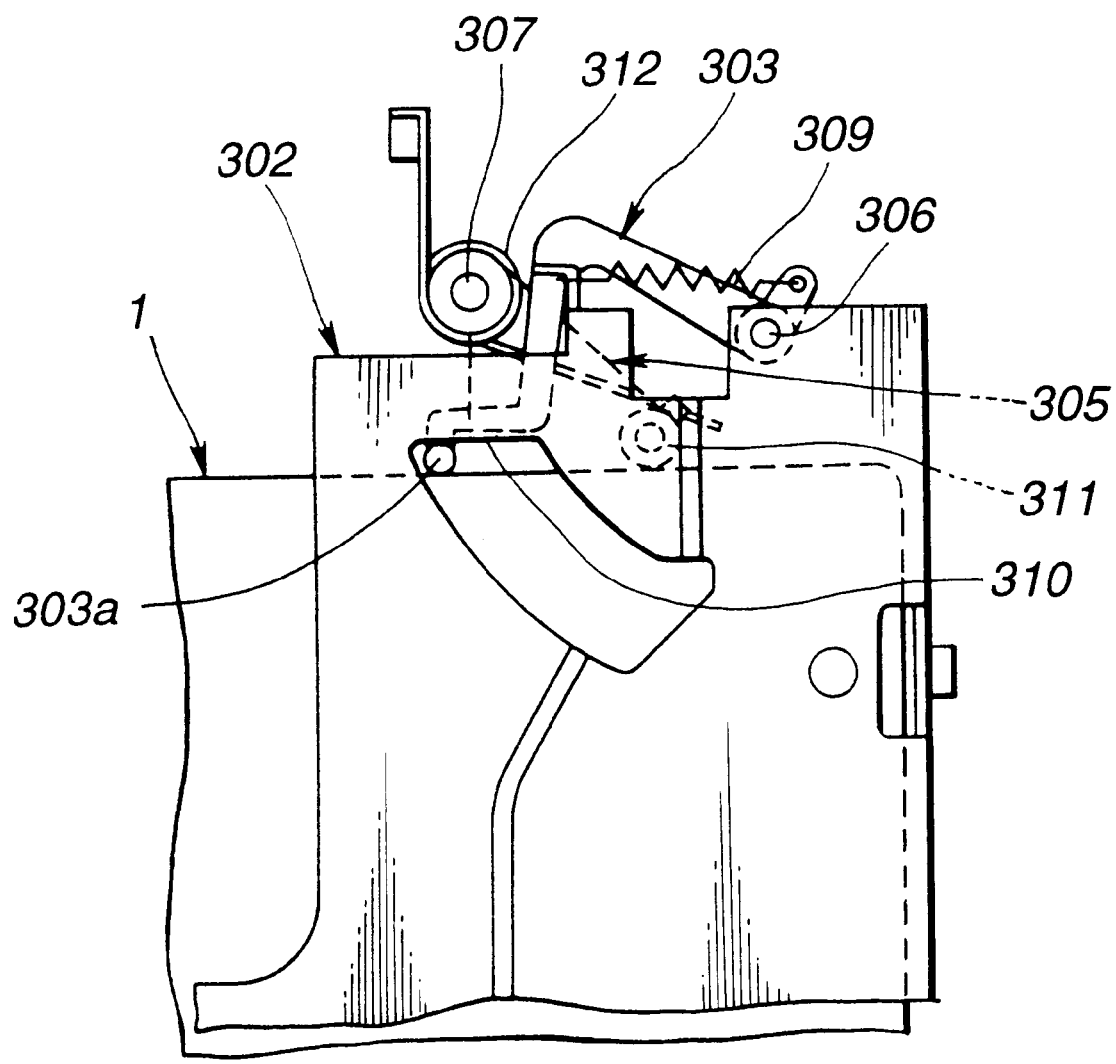
FIG. 20 is a view similar to FIG. 19, showing the operation of the subordinate drive upon misinsertion.
Figure 21:
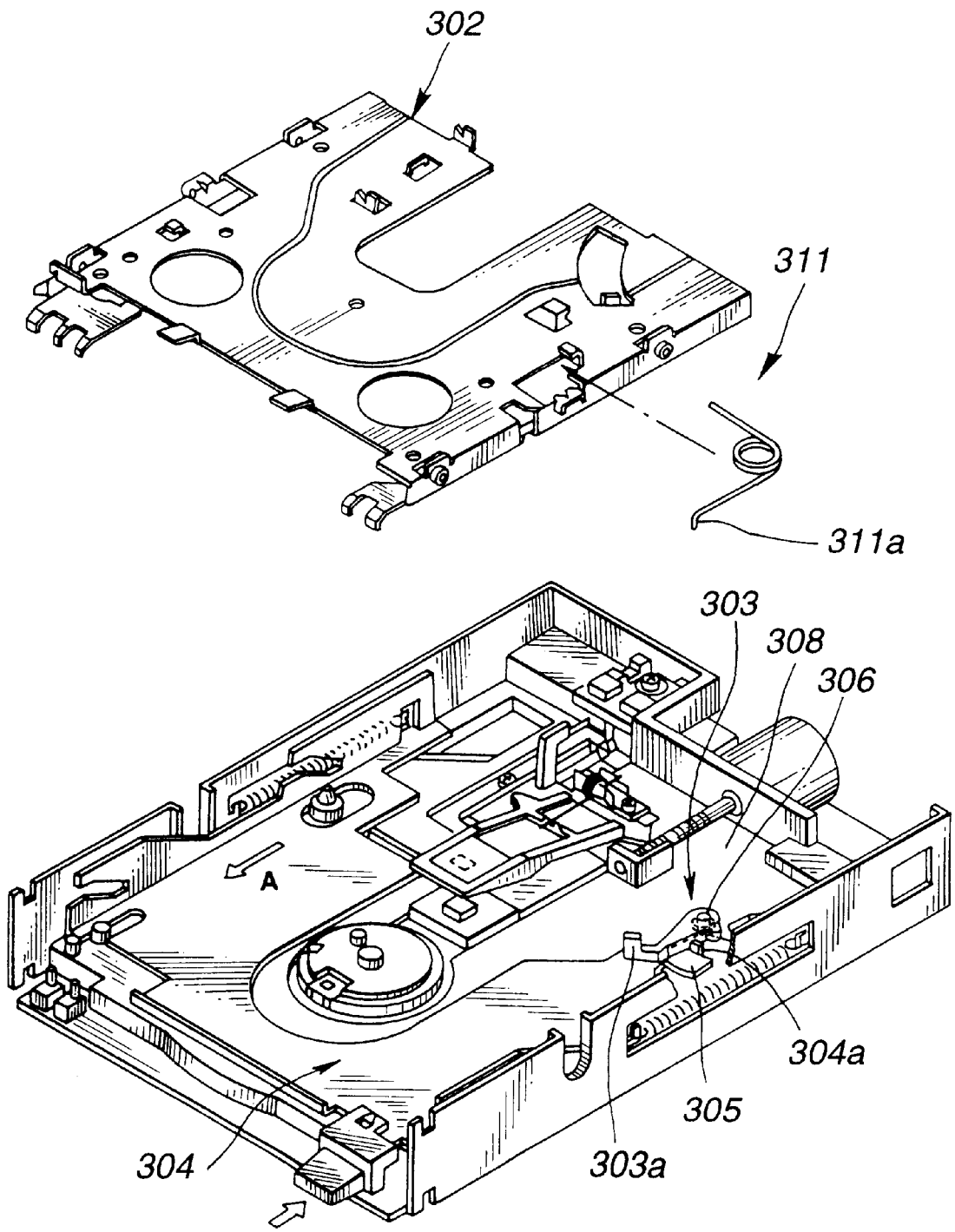
FIG. 21 is a view similar to FIG. 14, showing a known integrated-trigger-type subordinate drive.
Figure 22:
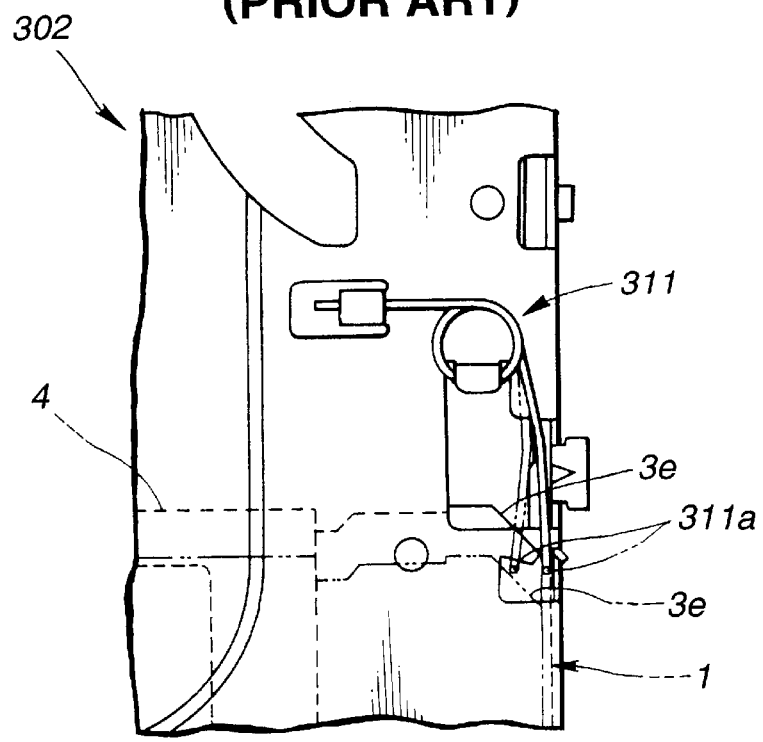
FIG. 22 is a view similar to FIG. 20, showing the operation of the subordinate drive upon normal insertion.
Figure 23:
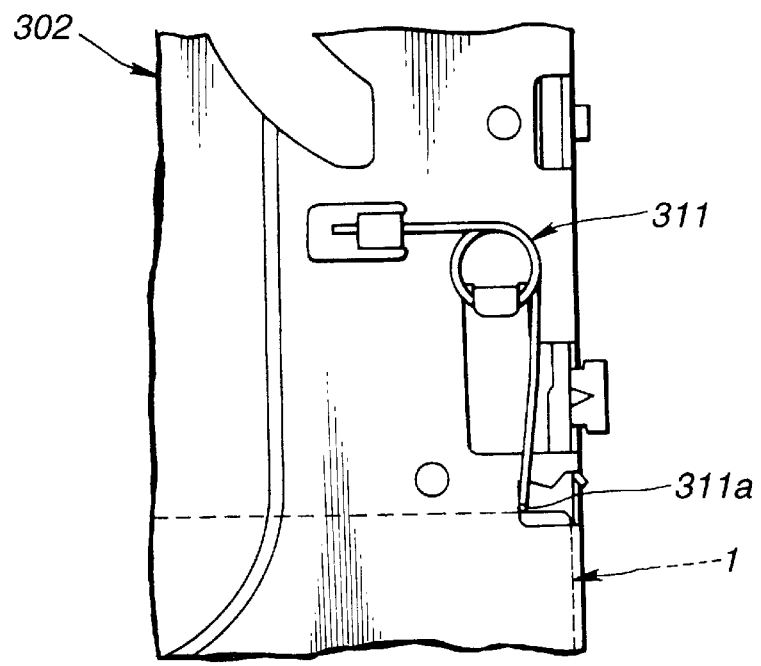
FIG. 23 is a view similar to FIG. 22, showing the operation of the subordinate drive upon misinsertion.
Figure 25:
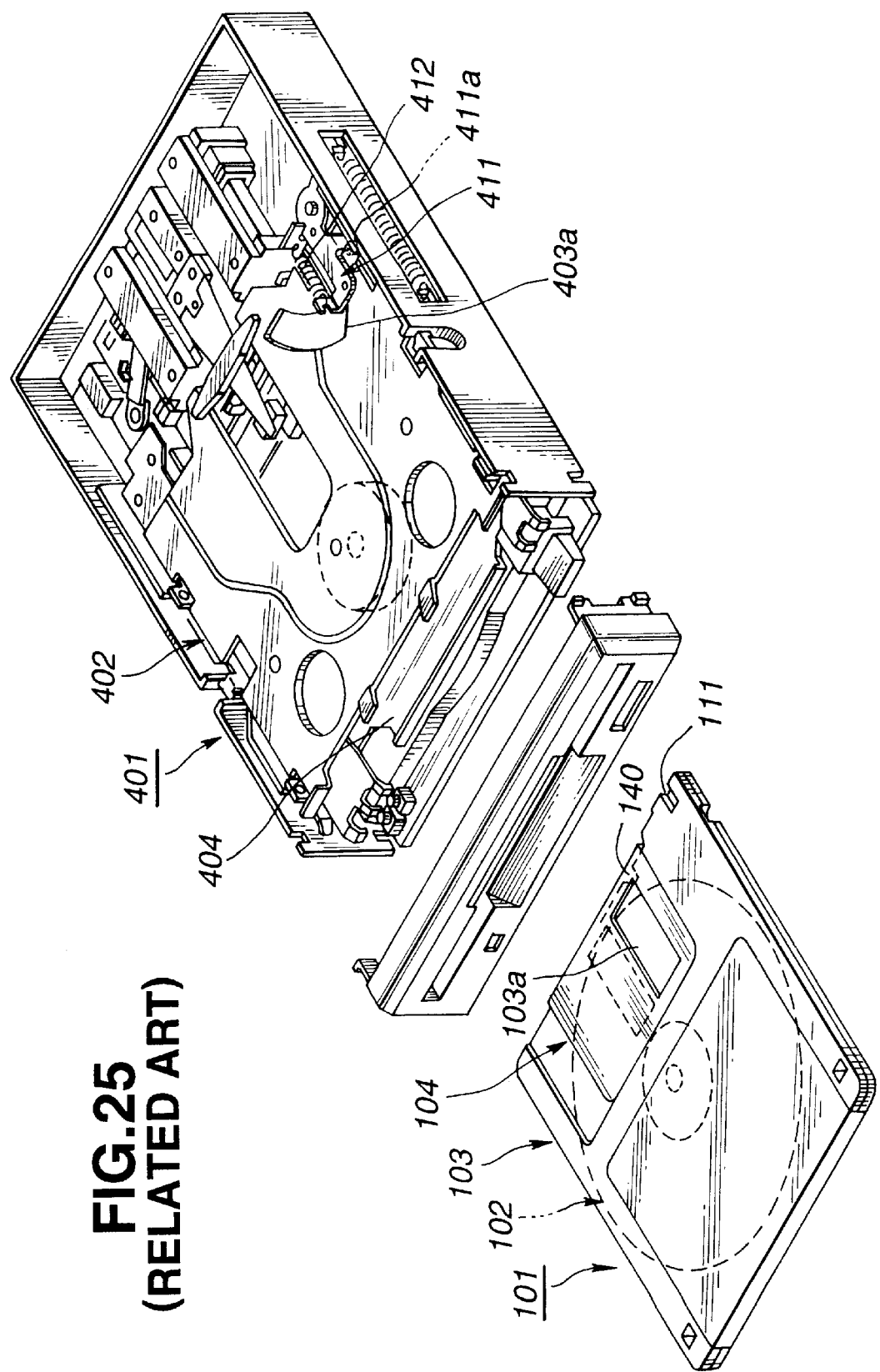
FIG. 25 is a view similar to FIG. 13, showing a related-art midordinate drive and the disc cartridge of second format.
Figure 26:
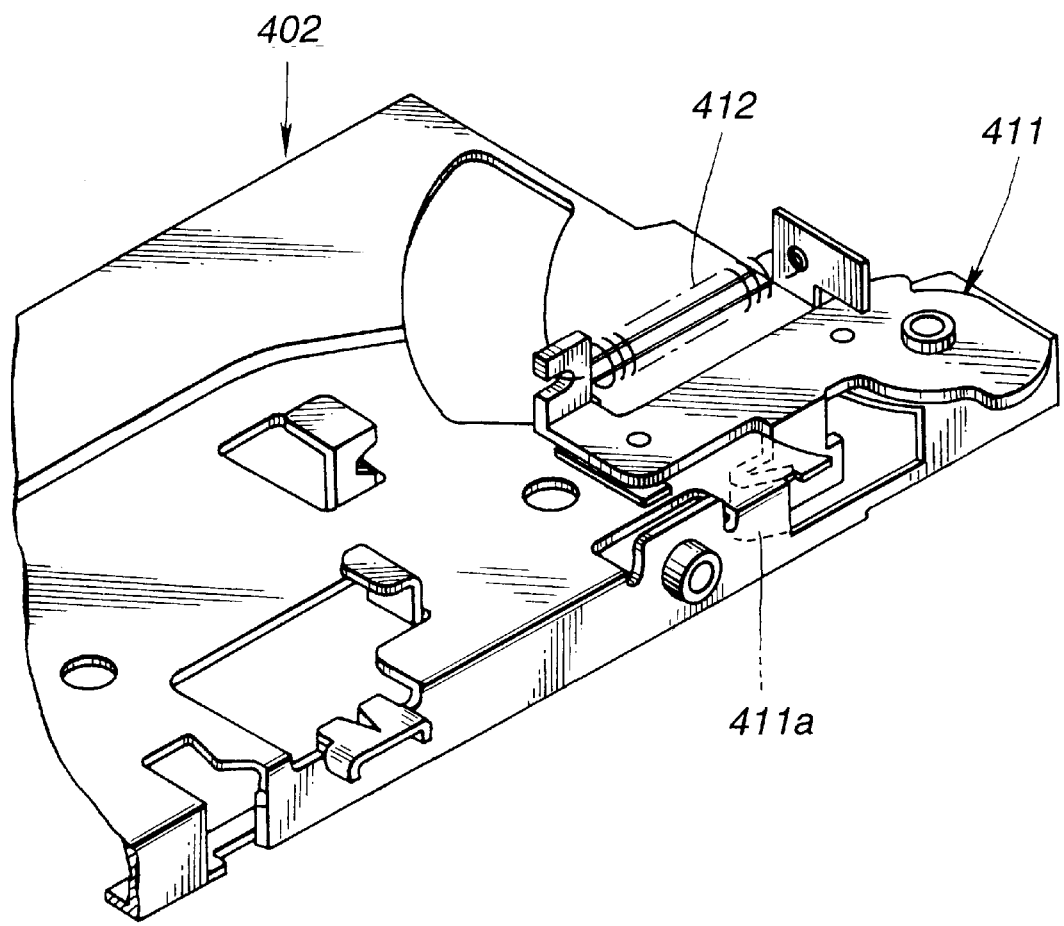
FIG. 26 is a view similar to FIG. 3, showing the midordinate drive.
Figure 27:
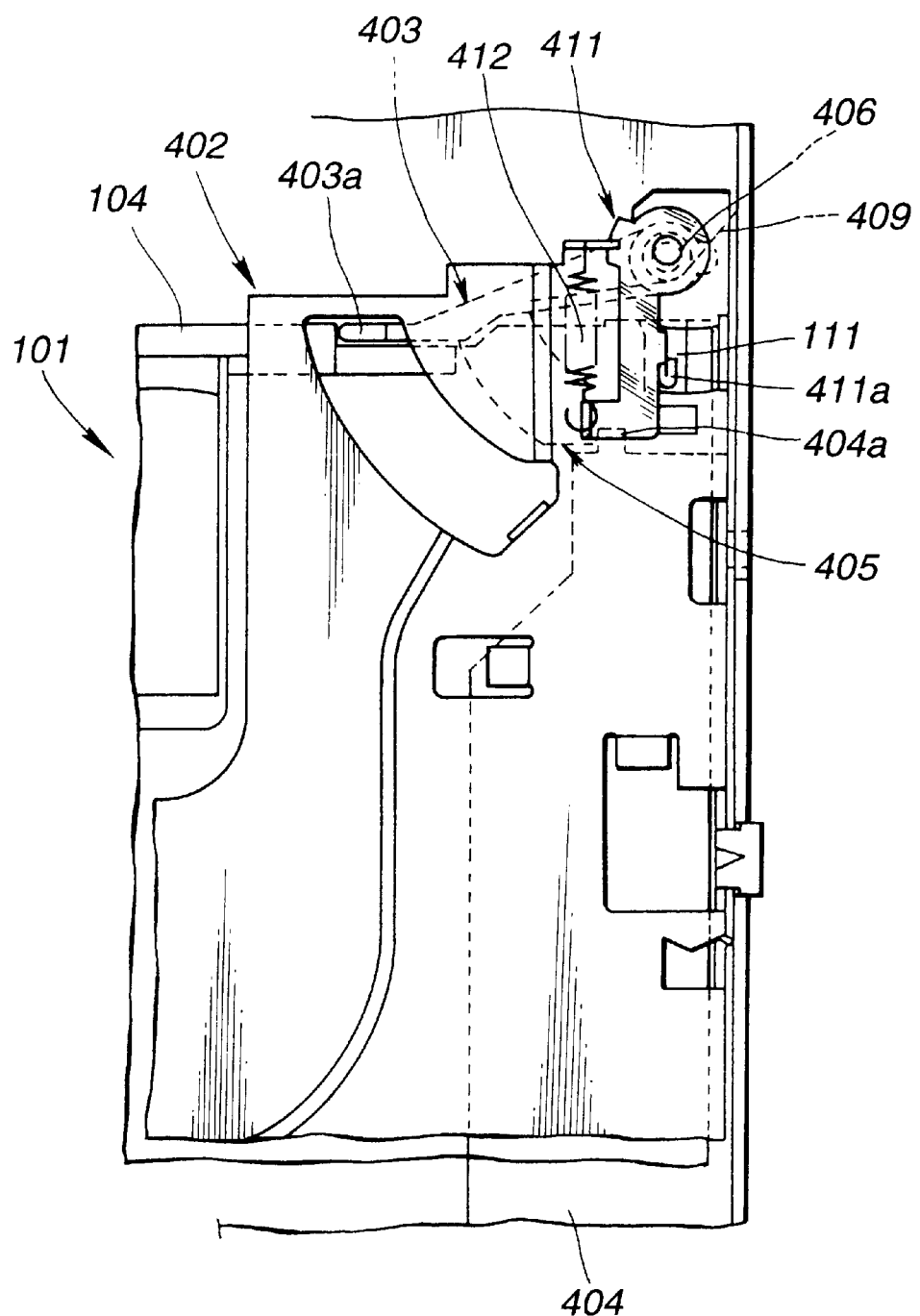
FIG. 27 is a view similar to FIG. 23, showing the operation of the midordinate drive.
Figure 28:
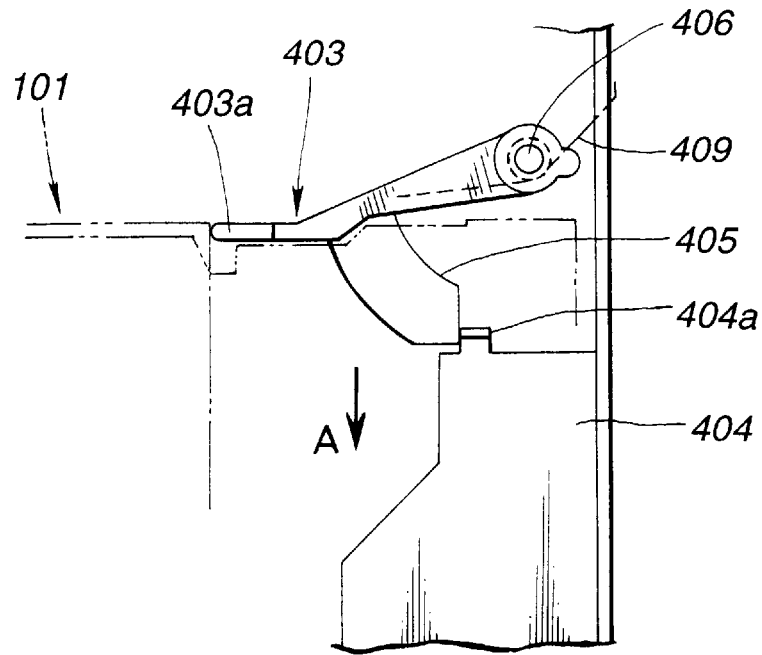
FIG. 28 is a view similar to FIG. 27, showing the operation of a related-art trigger lever.
Figure 29:
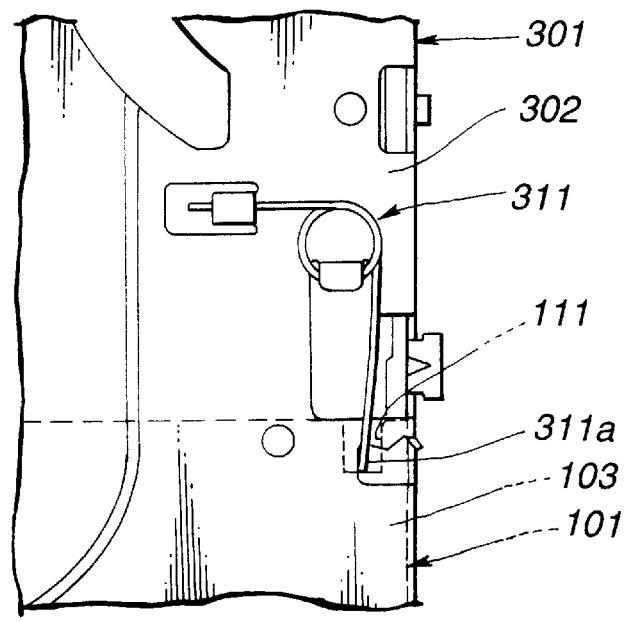
FIG. 29 is a view similar to FIG. 28, showing the operation of the known subordinate drive when inserting the disc cartridge of second format therein.
Figure 30:
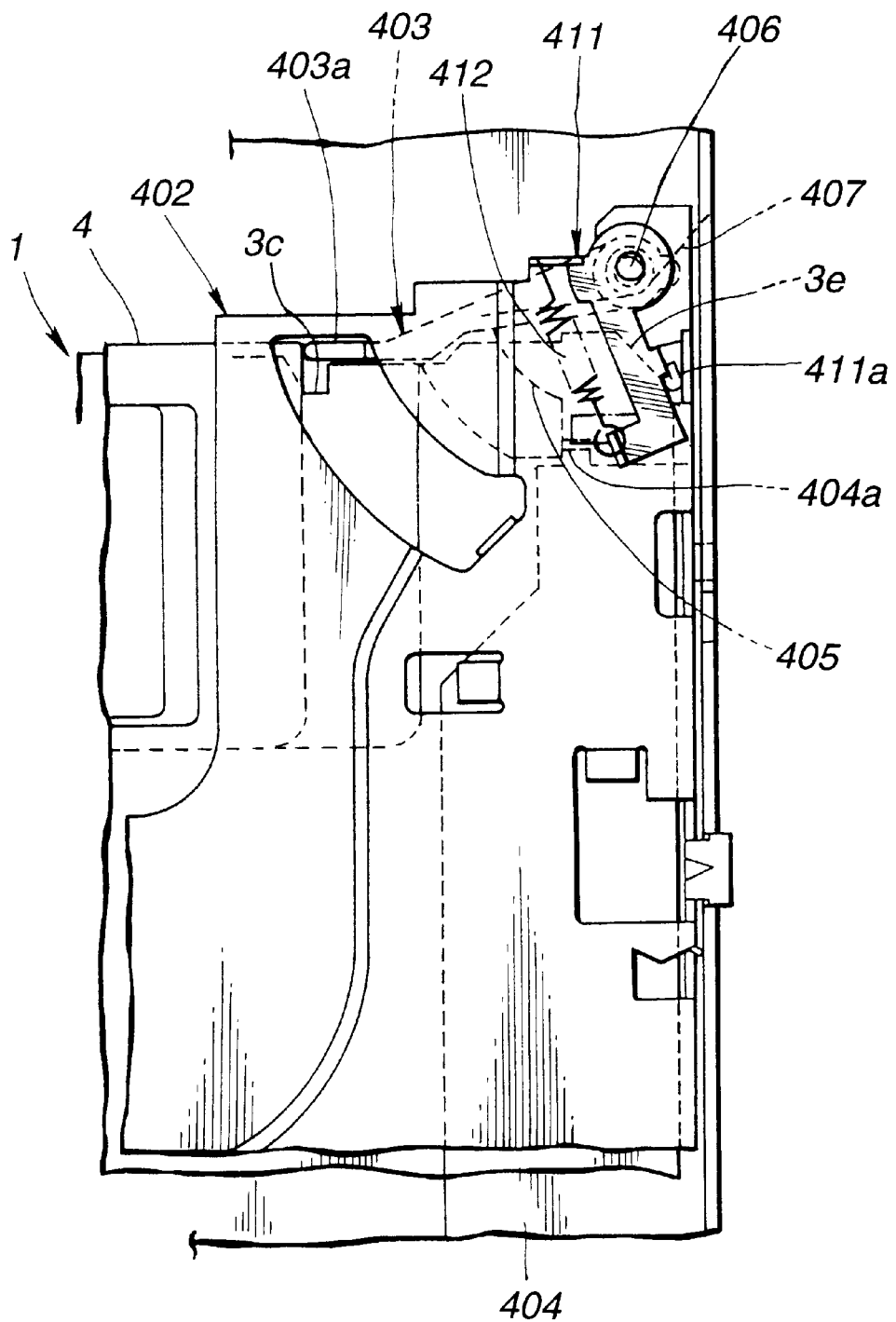
FIG. 30 is a view similar to FIG. 29, showing the operation of the prior-art subordinate drive when inserting the disc cartridge of second format therein.
Figure 31:
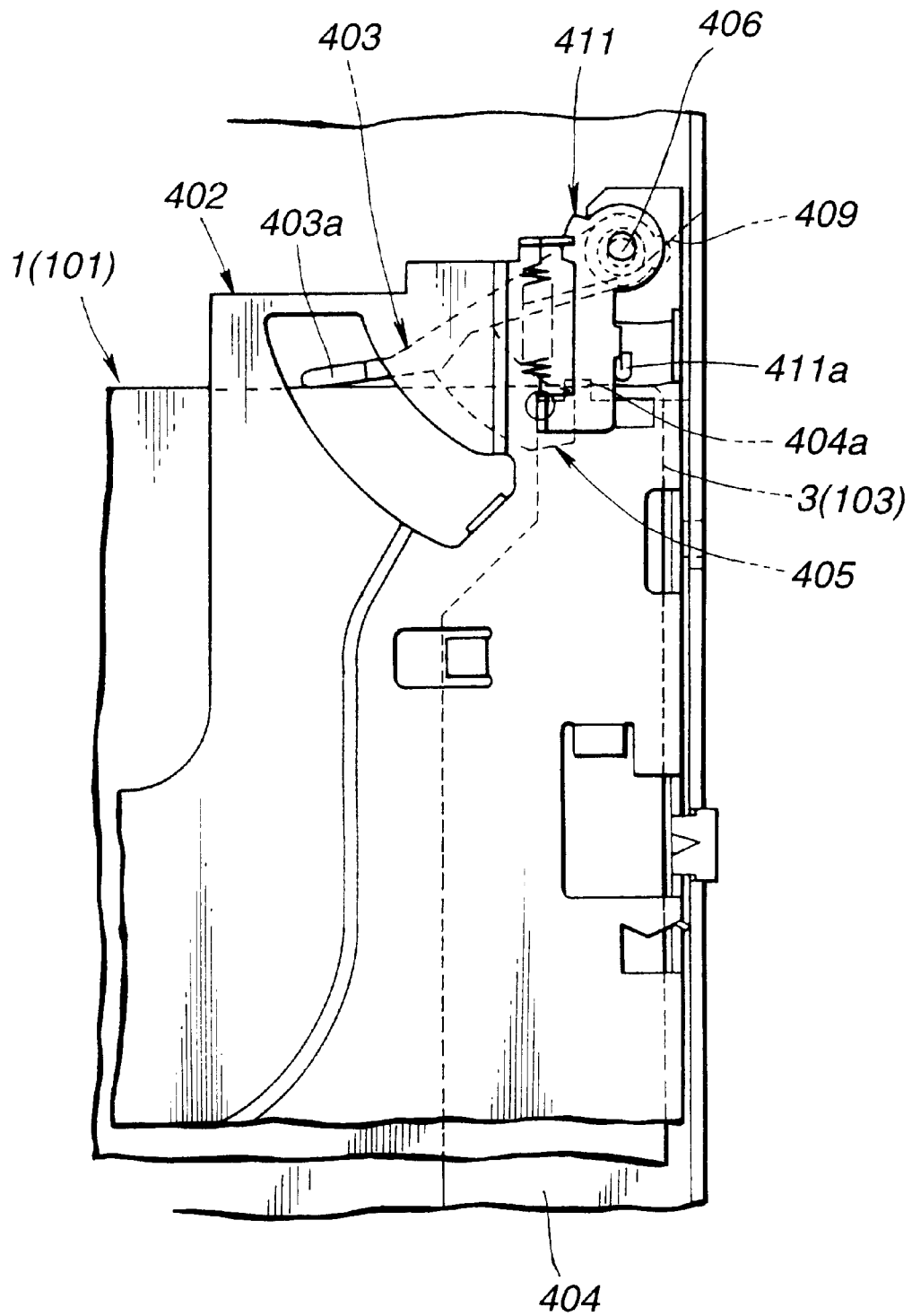
FIG. 31 is a view similar to FIG. 30, showing operation of the related-art midordinate drive when inserting the disc cartridge of second format or the disc cartridge of third format therein.

FIGS. 11–12 show a second embodiment of the present invention, the structure of which is substantially the same as that of the first embodiment except that the misinsertion preventing member 511 is formed by partly cutting and bending the upper-side plate of the cartridge holder 502 of the superordinate drive 501.

The structure for preventing misinsertion of disc cartridges according to the present invention produces the following advantages.

The structure can prevent misinsertion of the disc cartridge of first format into the superordinate drive.

Further, the structure includes a misinsertion preventing member in the form of a pin, so that the outer peripheral surface of the pin contributes to its smooth engagement with the groove.

Furthermore, the structure includes a misinsertion preventing member obtained by partly cutting and bending an upper-side plate of the cartridge holder, resulting in the reduced number of component parts.

Still further, due to the extension of the recording or reproducing openings of the disc cartridge of second format in the same way as those of the disc cartridge of third format, the structure can protect a magnetic head of the superordinate drive by preventing it from interfering with the periphery of the recording or reproducing openings of the disc cartridge of the second format even when enlarging the recording area of the disc-like recording medium of the disc cartridge of third format in accordance with the extension of its recording or reproducing openings, and extending the moving range of the magnetic head of the superordinate drive in accordance with enlargement of the recording area.

What is claimed is:

1. A system, comprising:

a first recording-medium cartridge of first format and a first drive corresponding to said first recording-medium cartridge;

a second recording-medium cartridge of second format and a second drive corresponding to said first and second recording-medium cartridge;

a third recording-medium cartridge of third format and a third drive corresponding to said second and third recording-medium cartridge;

first means for preventing misinsertion of said first, second and third recording-medium cartridges into said first drive;

second means for preventing misinsertion of said first, second and third recording-medium cartridges into said second drive; and third means for preventing misinsertion of said first, second and third recording-medium cartridges into said third drive, said first means comprising an inclination of a first corner of a front end face of said first recording-medium cartridge as viewed in a direction of insertion thereof into said first drive, and a first misinsertion preventing member arranged with said first drive, said first misinsertion preventing member cooperating with said inclination, when inserting said first recording-medium cartridge in a normal position, to allow loading thereof, said second means comprising a second corner of a frond end face of said second recording-medium cartridge as viewed in a direction of insertion thereof in said second drive, said second corner corresponding to said first corner of said first recording-medium cartridge and being formed with a groove, and a second misinsertion preventing member arranged with said second drive, said second misinsertion preventing member cooperating with said inclination of said first corner, when inserting said first recording-medium cartridge in a normal position, to allow loading thereof, said second misinsertion preventing member cooperating with said groove of said second corner, when inserting said second recording-medium cartridge in a normal position, to allow loading thereof, said third means comprising a third corner of said third recording-medium cartridge, said third corner corresponding to said groove of said second corner of said second recording-medium cartridge and being formed with a groove, and a third misinsertion preventing member arranged with said third drive, said third misinsertion preventing member cooperating with said inclination of said first corner, when inserting said first recording-medium cartridge in a normal position, to disallow loading thereof, said third misinsertion preventing member cooperating with said groove of corresponding one of said second and third corners, when inserting one of said second and third recording-medium cartridges, to allow loading thereof.

2. A system as claimed in claim 1, wherein said second drive includes a cartridge holder for moving said recording-medium cartridge as inserted between an insertion position and a loading position.

3. A system as claimed in claim 2, wherein said second misinsertion preventing member includes a lever formed with a protrusion and rotatably mounted to said cartridge holder of said second drive, and means for biasing said lever to rotate in a first direction.

4. A system as claimed in claim 3, wherein said third drive includes a cartridge holder for moving said recording-medium cartridge as inserted between an insertion position and a loading position.

5. A system as claimed in claim 4, wherein said third misinsertion preventing member includes a pin stationarily arranged with said third drive to correspond to said protrusion of said lever of said second drive.

6. A system as claimed in claim 4, wherein said third misinsertion preventing member is obtained by partly cutting and bending an upper-side plate of said third drive.

7. A structure for preventing misinsertion of recording-medium cartridges into drives, the recording-medium cartridges and drives including a first recording-medium cartridge of first format and a first drive corresponding to the first recording-medium cartridge, a second recording-medium cartridge of second format and a second drive corresponding to the first and second recording-medium cartridge, and a third recording-medium cartridge of third format and a third drive corresponding to the second and third recording-medium cartridge, the structure comprising:

first means for preventing misinsertion of the first, second and third recording-medium cartridges into the first drive;

second means for preventing misinsertion of the first, second and third recording-medium cartridges into the second drive; and third means for preventing misinsertion of the first, second and third recording-medium cartridges into the third drive, said first means comprising an inclination of a first corner of a front end face of the first recording-medium cartridge as viewed in a direction of insertion thereof into the first drive, and a first misinsertion preventing member arranged with the first drive, said first misinsertion preventing member cooperating with said inclination, when inserting the first recording-medium cartridge in a normal position, to allow loading thereof, said second means comprising a second corner of a frond end face of the second recording-medium cartridge as viewed in a direction of insertion thereof in the second drive, said second corner corresponding to said first corner of the first recording-medium cartridge and being formed with a groove, and a second misinsertion preventing member arranged with the second drive, said second misinsertion preventing member cooperating with said inclination of said first corner, when inserting the first recording-medium cartridge in a normal position, to allow loading thereof, said second misinsertion preventing member cooperating with said groove of said second corner, when inserting the second recording-medium cartridge in a normal position, to allow loading thereof, said third means comprising a third corner of the third recording-medium cartridge, said third corner corresponding to said groove of said second corner of the second recording-medium cartridge and being formed with a groove, and a third misinsertion preventing member arranged with the third drive, said third misinsertion preventing member cooperating with said inclination of said first corner, when inserting the first recording-medium cartridge in a normal position, to disallow loading thereof, said third misinsertion preventing member cooperating with said groove of corresponding one of said second and third corners, when inserting one of the second and third recording-medium cartridges, to allow loading thereof.

* * * * *